US012613719B1

(12) United States Patent
Rochin et al.

(10) Patent No.: US 12,613,719 B1
(45) Date of Patent: *Apr. 28, 2026**

(54) USER DEVICE CONFIGURATION SPECIFICATION AND CONFLICT RESOLUTION MODULE

(71) Applicant: Iru, Inc., Coral Gables, FL (US)

(72) Inventors: Rachel Rochin, Palm Desert, CA (US); Michael Boylan, Bellevue, WA (US)

(73) Assignee: Iru, Inc., Coral Gables, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/065,766

(22) Filed: Feb. 27, 2025

Related U.S. Application Data

(63) Continuation of application No. 19/050,215, filed on Feb. 11, 2025.

(51) Int. Cl.
*G06F 9/451* (2018.01)
(52) U.S. Cl.
CPC .................................. *G06F 9/451* (2018.02)
(58) Field of Classification Search
CPC ...................................................... G06F 9/451
See application file for complete search history.

(56) References Cited

U.S. PATENT DOCUMENTS

| | | | |
|---|---|---|---|
| 12,169,802 B1 * | 12/2024 | Eldan ..................... | G06F 40/186 |
| 2007/0027972 A1 | 2/2007 | Agrawal et al. | |
| 2009/0044185 A1 | 2/2009 | Krivopaltsev | |

| | | | |
|---|---|---|---|
| 2010/0037088 A1 | 2/2010 | Krivopaltsev et al. | |
| 2010/0180221 A1 | 7/2010 | Cloward et al. | |
| 2016/0057020 A1 | 2/2016 | Halmstad et al. | |
| 2017/0329506 A1 * | 11/2017 | Laetham .................. | G06F 9/451 |
| 2019/0149325 A1 * | 5/2019 | Garagiola ............. | H04L 9/3239 380/278 |
| 2019/0392617 A1 * | 12/2019 | Laetham ............. | G06F 3/04847 |
| 2020/0186982 A1 | 6/2020 | Hardy et al. | |
| 2020/0389525 A1 | 12/2020 | Hardy et al. | |
| 2021/0318893 A1 * | 10/2021 | Zhang .................. | G06F 3/04842 |
| 2021/0357801 A1 * | 11/2021 | Ji ......................... | G06F 21/6245 |

(Continued)

OTHER PUBLICATIONS

Zapier, "The blueprint for your automations", pp. 1-6. (Year: 2023).*

*Primary Examiner* — Kevin L Young
*Assistant Examiner* — Phuong N Hoang
(74) *Attorney, Agent, or Firm* — MLO, a professional corp.

(57) ABSTRACT

In some examples, a method involves rendering a graphical user interface having an Assignment Map canvas for specifying an Assignment Map, the Assignment Map graphically representing configuration data for a set of one or more user devices. User input specifies a set of conditional logic blocks at respective graphical positions within the Assignment Map canvas, each conditional logic block comprising one or more conditional logic nodes, each conditional logic node having a respective assignment rule and a respective set of Library Items. For each user device, the set of conditional logic blocks are evaluated in an order determined by a relative graphical position of each conditional logic block along a root line within the Assignment Map canvas. Each user device is then configured using respective configuration data generated based on an evaluation outcome of the plurality of conditional logic blocks.

17 Claims, 26 Drawing Sheets

600

(56)     References Cited

U.S. PATENT DOCUMENTS

| | | | |
|---|---|---|---|
| 2022/0360608 A1* | 11/2022 | Raleigh | H04L 47/2408 |
| 2024/0126896 A1* | 4/2024 | Elfadel | G06F 21/602 |
| 2024/0168966 A1* | 5/2024 | Whilden | G06F 16/244 |
| 2024/0430164 A1* | 12/2024 | Gad | H04W 24/02 |
| 2025/0192979 A1* | 6/2025 | Boehler | G06N 5/01 |

* cited by examiner

100

Management Platform

Assignment Maps Module <u>411</u>

Library Items Module <u>413</u>

Managed Devices Module <u>414</u>

Configurations Sync. Module <u>415</u>

Other Modules <u>417</u>

Management
Database(s)
<u>416</u>

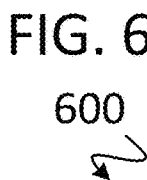

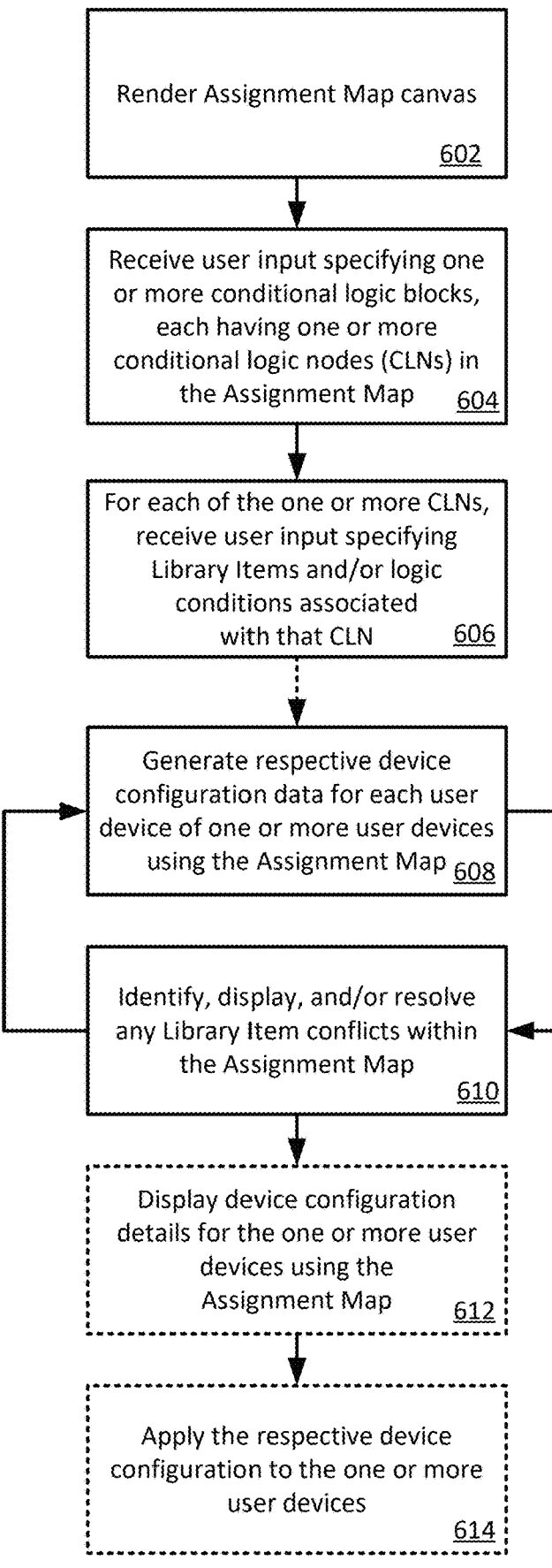

Render Assignment Map canvas

602

Receive user input specifying one or more conditional logic blocks, each having one or more conditional logic nodes (CLNs) in the Assignment Map   604

For each of the one or more CLNs, receive user input specifying Library Items and/or logic conditions associated with that CLN   606

Generate respective device configuration data for each user device of one or more user devices using the Assignment Map 608

Identify, display, and/or resolve any Library Item conflicts within the Assignment Map

610

Display device configuration details for the one or more user devices using the Assignment Map   612

Apply the respective device configuration to the one or more user devices

Compute Node

CPU(s) 1002

Memory 1004

Non-Volatile Storage 1006

Network I/O 1008

Other Modules 1010

1000

USER DEVICE CONFIGURATION SPECIFICATION AND CONFLICT RESOLUTION MODULE

RELATED APPLICATIONS

This application is a continuation of U.S. application Ser. No. 19/050,215 filed on Feb. 11, 2025, and entitled "User Device Configuration Specification and Conflict Resolution Module"; which is hereby incorporated by reference for all purposes.

BACKGROUND

Mobile Device Management (MDM) platforms are centralized software solutions designed to configure, monitor, and secure mobile devices, such as smartphones, tablets, and computers, within an organization. These platforms enable administrators to manage a wide array of user device settings, applications, and security protocols remotely, often through cloud-based interfaces. By leveraging MDM, organizations can enforce policies, deploy software updates, control access to network resources, and ensure data protection for managed devices. MDM solutions are widely adopted across various industries to streamline device administration, enhance security, and maintain compliance with organizational or regulatory standards.

User device configuration software, such as an MDM platform, often allows administrators to define respective settings and configurations for user devices based on attributes of either the device and/or the user using the device. For example, some software configurations may depend on an operating system type and version installed on a user device. Additionally, the user's role within the organization may dictate which software packages are installed on that user's device. However, in some scenarios, the software packages that are designated to be on a user's device may conflict with one another. For example, a software developer may need to use a version of a software package having advanced capabilities as compared to a version of the software package that an employee in a marketing role may need to use.

In some conventional MDM solutions, user devices are labeled/categorized into groups, and settings and configurations are thereafter applied directly to these groups. In order to view or troubleshoot the settings for a single user device—importantly, both what was assigned and what was not assigned to that device—the administrators would need to look at each group that the user device belongs to and then open up the group to see a list of the settings and configurations. Or, looking at a user device to see the aggregate set of configurations applied, the administrators would then need to identify the groups that were not matched to identify settings that were not applied. If there are overlapping or conflicting settings, other conventional solutions utilizing group fail to resolve or prevent conflicts.

In conventional MDM solutions that do not use groups, a "stepped hierarchy", often called "organizational units", or "OUs", may be used. Some of these conventional solutions provide simple conflict resolution through the OU hierarchy, but the hierarchies are entirely linear, without consideration for more complex needs that would otherwise need to "break out" of the hierarchy.

Still yet other conventional MDM solutions may offer a visual "workflow building tool" that provides an interface for defining state-based sequential actions for configuring user devices. However, such workflows are once again tied to a group or set of groups, potentially allowing for conflicts.

SUMMARY

In some aspects, the techniques described herein relate to a method, including: graphically rendering, by one or more processors, a graphical user interface having an Assignment Map canvas for specifying an Assignment Map, the Assignment Map graphically representing configuration data for a set of one or more user devices; receiving, by the one or more processors, user input specifying a plurality of conditional logic blocks at respective graphical positions within the Assignment Map canvas, each conditional logic block including a set of one or more conditional logic nodes, each conditional logic node having a respective assignment rule and a respective set of one or more Library Items; for each user device of the set of one or more user devices, evaluating, by the one or more processors, the plurality of conditional logic blocks in an order determined by relative graphical position of each conditional logic block along a root line within the Assignment Map canvas; and configuring, by the one or more processors, each user device using respective configuration data generated based on an evaluation outcome of the plurality of conditional logic blocks.

BRIEF DESCRIPTION OF THE DRAWINGS

FIG. 6 shows a simplified portion of a process for user device configuration and conflict resolution using Assignment Maps, in accordance with some examples.

FIG. 10 shows a simplified hardware implementation of a compute node, in accordance with some examples.

DETAILED DESCRIPTION

Figure 1:
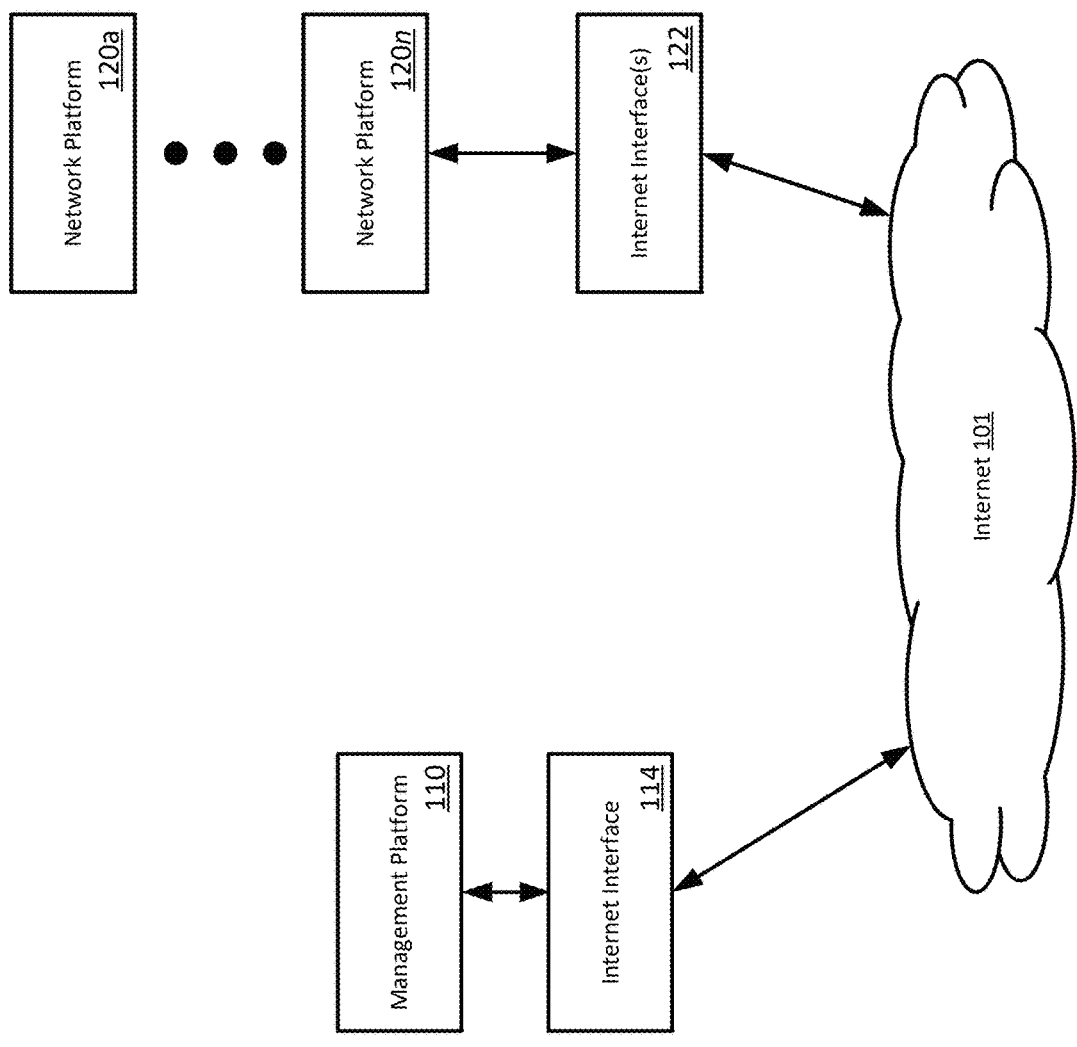
FIG. 1 shows a simplified operational environment for a user device configuration specification and conflict resolution module (an "Assignment Maps module"), in accordance with some examples.

Systems and methods are disclosed herein for managing configurations across multiple computing devices ("user devices") within an organization using a user device configuration specification and conflict resolution module, referred to herein as an "Assignment Maps module." The Assignment Maps module provides a robust mechanism to deploy configurations, applications, and policies (referred to herein as "Library Items") to specific user devices based on conditional logic and assignment rules graphically represented and configured in an "Assignment Map". This modular approach advantageously allows for flexible, adaptive, and precise management of user device settings, applications, and security protocols, enhancing efficiency and control in environments with diverse device requirements.

Unlike conventional MDM solutions that often rely on group-based approaches, Assignment Maps address the challenges and limitations associated with existing systems with a granular hierarchical approach. In many group-based solutions, configurations and settings are directly tied to device groups, requiring administrators to view or troubleshoot configurations by examining each group a device belongs to and piecing together an aggregate view of applied and unapplied settings. Such systems lack a cohesive and intuitive way to identify conflicting or overlapping settings across groups.

Moreover, user group memberships can exacerbate conflict resolution issues, particularly when multiple groups assign contradictory settings to the same user device. For example, if a User X is a member of several groups (e.g., "Engineering", "North America", and "Managers"), multiple conflicting settings may be assigned to that user's device using conventional solutions. In this example, Engineers may be assigned a first operating system variant, while Managers are assigned a second operating system variant. However, the user device cannot run both variants of the operating system concurrently. Such conventional solutions lack the ability to specify, to paraphrase, that "In the case that User X is assigned multiple operating systems, the first operating system should take priority."

Some conventional MDM solutions may employ hierarchical models, such as "organizational units" (OUs), to organize and apply configurations. While these hierarchies provide some degree of conflict resolution through their stepped, linear structure, they lack the flexibility needed to address more complex configuration scenarios that require multidimensional logic or branching workflows. Additionally, some conventional solutions provide visual workflow builders that allow for sequencing configuration steps, but these workflows remain tied to groups and do not inherently resolve conflicts or leverage group data effectively within the workflow itself.

Assignment Maps overcome these shortcomings by introducing an exclusive and self-contained structure for device configuration. Each Assignment Map is exclusive to a single user device or set of devices, meaning a user device can belong to only one Assignment Map at a time and no logical "dead ends" can exist within the specification. This exclusivity ensures that all settings and configurations applicable to a device are displayed within the Assignment Map itself, providing a complete and unambiguous representation of the configurations. Administrators can see not only what has been applied to a user device but, importantly, what has not been applied, thereby eliminating the need to reference external groups or settings.

Assignment Maps are specified by an administrator using a series of conditional logic blocks, each of which includes a set of conditional statements (e.g., "if," "else if," and "else" conditions) to make decisions about which Library Items to apply to given user devices. This structure advantageously resolves conflicts through a priority hierarchy represented in the Assignment Map, with conditions and configurations scoped later along an evaluation flow order taking precedence over configurations made earlier in the evaluation flow in the event of a conflict. As a result, overlapping or conflicting configurations are avoided without requiring additional administrative effort.

The Assignment Maps module also employs a deterministic layout engine, ensuring that the graphical representation of the Assignment Map is consistent and predictable for all administrators. This consistency enhances usability and simplifies collaboration in environments where multiple administrators may interact with the same Assignment Map. Moreover, Assignment Maps are highly scalable, with no practical technical limitations in terms of size or complexity. Administrators can define deeply nested conditions and intricate logic without concern for system performance or constraints.

One notable advantage of Assignment Maps as disclosed herein is their ability to provide a unique device lookup feature. This feature enables administrators to visually trace the logic of the Assignment Map as evaluated by the platform for a specific user device. The platform dynamically renders the path through the conditional logic blocks, highlighting satisfied conditions and greying out unsatisfied ones. This visual representation quickly eliminates ambiguity about which assignment rules were matched or not matched.

FIG. 1 shows a simplified operational environment 100 for a user device configuration specification and conflict resolution module (an "Assignment Maps module"), in accordance with some examples. In general, the operational environment 100 includes a remote management platform 110 (e.g., a remote MDM server), network platforms 120a-120n, internet interfaces 114 and 122, and a network communication plane designated as Internet 101.

The management platform 110 is configured to manage and deploy device configurations to a network of user devices across one or more network platforms, represented collectively as the network platforms 120a through 120n. The management platform 110 provides many different functionalities, including: maintaining available user device configurations, and also maintaining collections of configurations that are based on security standards; receiving administrator selections of configurations that apply to identified groups of user devices; providing local device agents to the identified user devices to register those user devices, implementing and remediating user device configurations; providing selected configurations and any modules needed to implement the configurations to user devices; and generating reports that detail compliance statuses of those user devices.

The management platform 110 includes one or more of the management databases that store data that is used during processes for determining sets of configurations to associate with groups of user devices and methods for implementing a set of configurations on a user device and validating compliance with the configurations during scheduled intervals. In some examples, the data stored in the management databases specifies or represents a library of separate configurations or collections of configurations, sets of configurations selected by administrators of network platforms, groups of user devices selected by administrators of network platforms, and reportable data that is determined from data reported by groups of user devices. Individual, pre-built scripts for implementing individual configurations may also be stored in the management databases. The scheduled intervals may range from minutes (e.g., every 5 minutes or 15 minutes), to hours (e.g., every hour), to days (e.g., every day, every other day), to an event-based scheduled interval (e.g., on user device boot-up). In some examples, two or more scheduled intervals may be used simultaneously (e.g., checking configurations on user device boot-up and then every 15 minutes thereafter).

The management platform 110 includes computer software instructions that are used to carry out different aspects of methods for determining sets of configurations to associate with groups of user devices and for implementing a set of configurations on a user device and validating compliance with the configurations during scheduled intervals.

The management platform 110 communicates with the broader network environment via the internet interface 114 which facilitates the transmission of data over the Internet 101. Through this interface, the management platform 110 sends configuration data, including that generated using an Assignment Maps module (not shown), to user devices of the connected network platforms 120a-120n, ensuring that the user devices receive appropriate settings in accordance with organizational policies. The management platform 110 may also collect status information from each user device, enabling the administrator to monitor compliance and troubleshoot any configuration issues that may arise on the network platform.

Likewise, each network platform 120a-120n communicates with the management platform 110 through one or more internet interfaces 122. In some scenarios, each of the network platforms 120a-120n may represent a separate organization (e.g., a school, a hospital, a company, etc.). In other scenarios, two or more of the network platforms 120a-120n may be associated with the same organization (e.g., remote regional divisions, local organizational divisions, etc.).

The management platform 110 may be implemented as a third-party software as a service (SaaS) product used by administrators of the network platforms 120a-120n. As mentioned above, the management platform 110, utilizing the Assignment Maps module disclosed herein, generates granular user device configurations based on conditional logic blocks and conditional logic nodes to facilitate centralized user device management.

Figure 2:
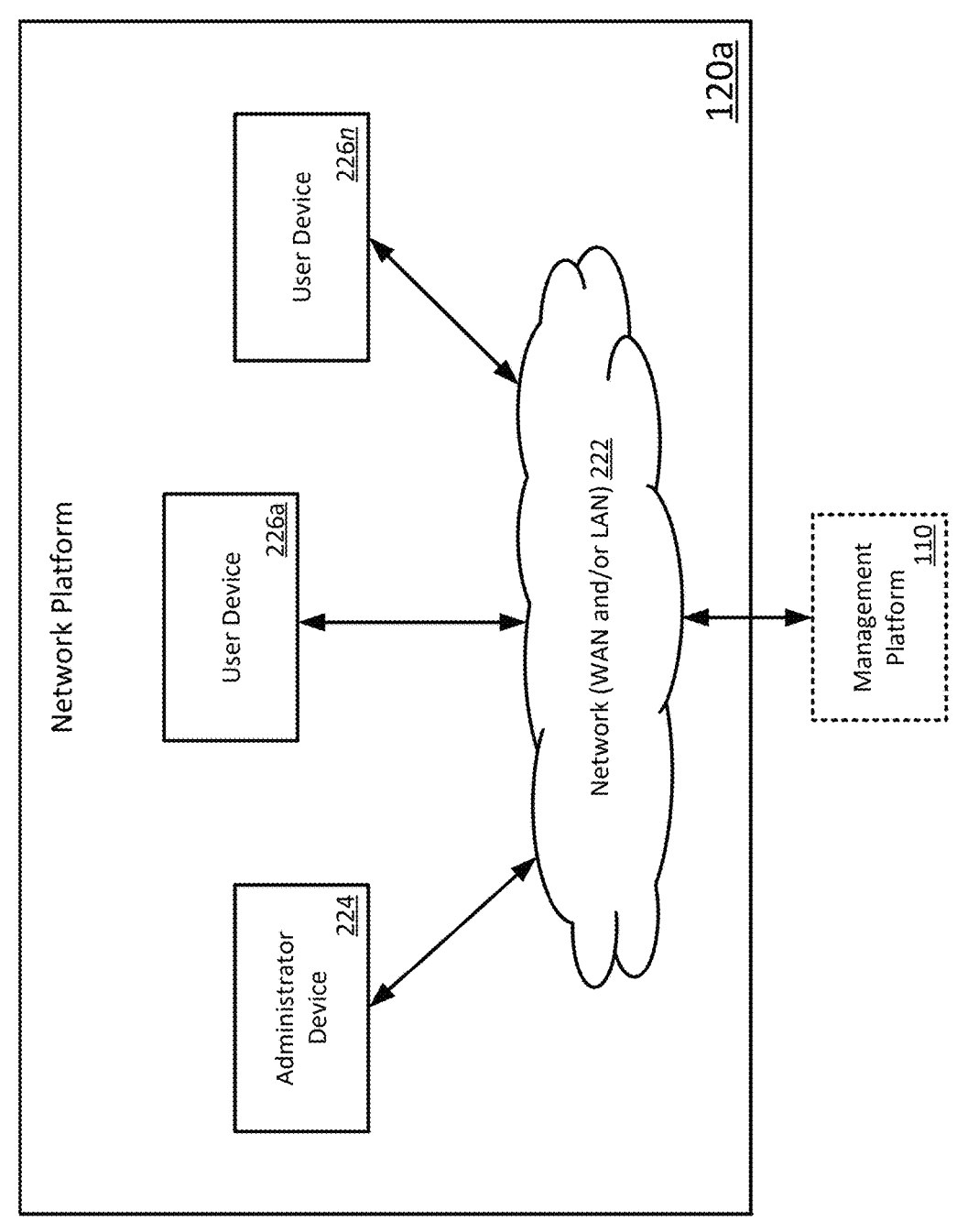
FIG. 2 shows a simplified example of a network platform of the operational environment in FIG. 1, in accordance with some examples.

FIG. 2 illustrates an example network platform 120a of the network platforms 120a-120n, which operates as part of the broader device management environment depicted in FIG. 1, in accordance with some examples. The network platform 120a includes multiple interconnected devices, such as an administrator device 224 and various user devices 226a-226n, each connected through a network 222. The network 222 may represent a wide area network (WAN), a local area network (LAN), or a combination thereof, enabling communication among devices within the network platform 120a and with the management platform 110.

The administrator device 224 is used by an administrator or IT personnel responsible for managing configurations across user devices on the network platform 120a (and possibly other network platforms). The administrator device 224 communicates with the management platform 110 to configure and deploy configurations to the user devices on the network platform. Through the administrator device 224, administrators can customize Assignment Maps using an Assignment Maps module (not shown), define conditional logic blocks and nodes, and specify Library Items tailored to the roles or attributes of the user devices within the network platform.

The user devices 226a-226n represent endpoints (e.g., laptop computers, smart phones, desktop computers, tablet computers, etc.) on the network platform 120a that receive configurations managed by the management platform 110. Each user device may differ in terms of user role, device type, or network permissions, and thus may require specific configurations. Using Assignment Maps defined by an administrator via the management platform 110, each user device 226a-226n can receive respective settings, applications, and policies based on the outcome of evaluated conditional logic nodes and associated Library Items. These configurations ensure that each user device meets the organization's requirements for functionality and security.

Figure 3:
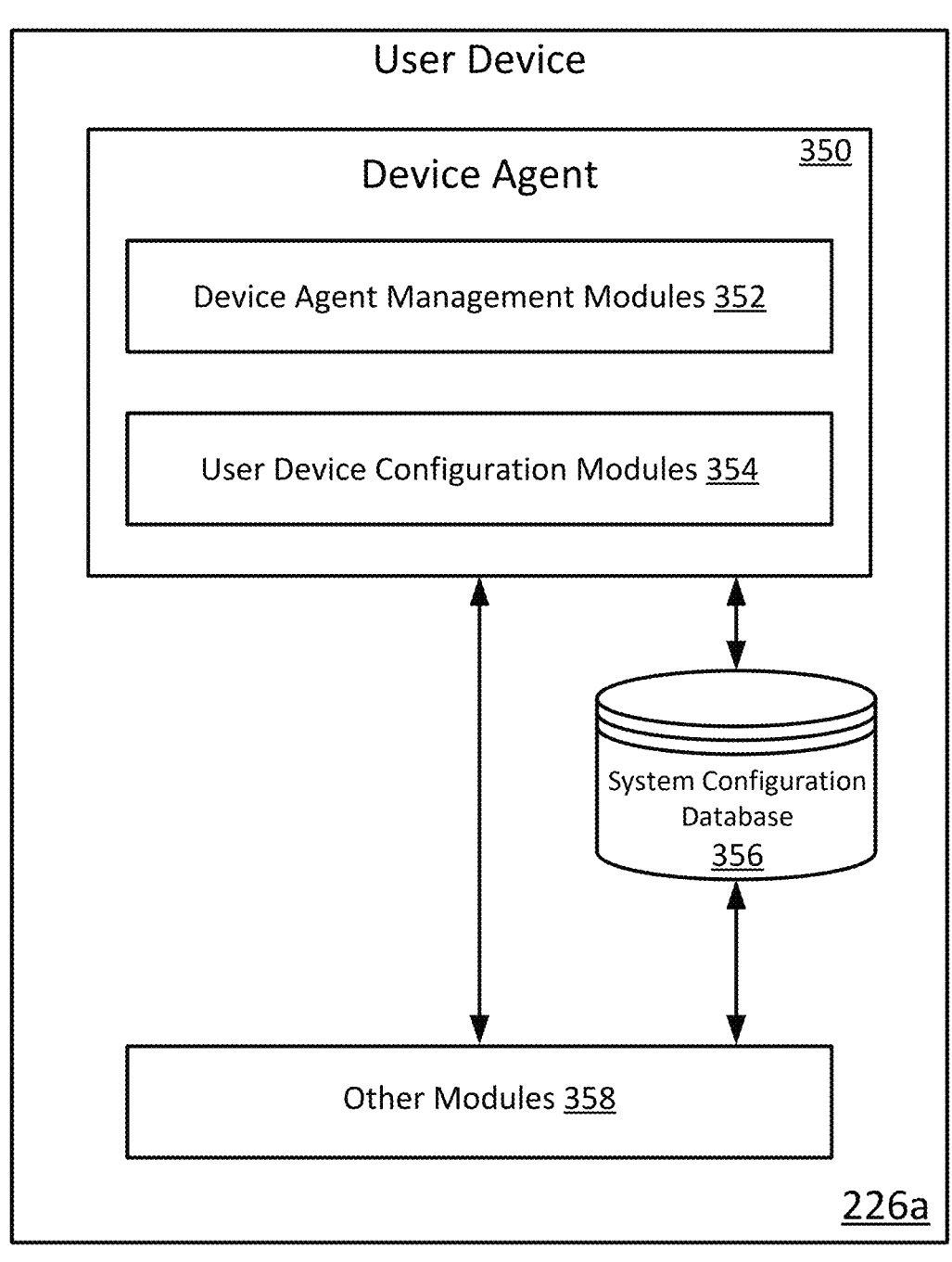
FIG. 3 shows a simplified example of a user device of the network platform shown in FIG. 2, in accordance with some examples.

FIG. 3 depicts a simplified example of a user device 226a of the network platform 120a introduced in FIG. 2, in accordance with some examples. The user device 226a is configured to receive and implement configuration data generated by the management platform 110, thereby ensuring compliance of the user device 226a with organizational policies. In some examples, the user device 226a includes a device agent module 350, which operates in coordination with other components and modules on the user device to apply and monitor configurations provided by the management platform 110. In other words, the device agent 350 is central to receiving, processing, and enforcing the configuration data transmitted by the management platform 110. In some examples, the device agent 350 includes a device agent associated with the management platform 110, as well as device agents that may be associated with an operating system or other software applications at a user device.

In some examples, the device agent 350 is installed at the user device 226a by the management platform 110. In other examples, the device agent 350 is installed, or is caused to be installed, on the user device 226a as part of a factory setup, pre-shipping setup, or re-seller setup process of the user device 226a.

The device agent 350 comprises multiple modules, including device agent management modules 352, user device configuration modules 354, and other modules (not shown). The device agent management modules 352 handle communication with the management platform 110 (e.g., via the network 222 shown in FIG. 2), including receiving configuration data generated by the management platform 110 after parsing and processing an Assignment Map specified by an administrator of the network platform 120a. The device agent management modules 352 also transmit periodic, or event-drive, status updates back to the management platform 110 to indicate the success or failure of the user device configuration, as well as to provide logs of user device activity.

The user device configuration modules 354 configure the associated user device 226a in accordance with the configuration data received from the management platform 110 and as directed by the device agent management modules 352. This includes deploying the specified Library Items-such as security settings, application installations, or network configurations-on the user device 226a. The user device configuration modules 354 also handle any remediation steps necessary if the applied configuration is incomplete or encounters errors during execution.

The system configuration database 356 provides a local data store for configuration-related information, including the received configuration data, the status of deployed Library Items, and logs of prior configurations. The system configuration database 356 ensures that the user device 226a can enforce configurations and maintain compliance even in offline scenarios where direct communication with the management platform 110 is temporarily unavailable. Additionally, the system configuration database 356 may be configured to facilitate rollback or reapplication of configurations if updates or changes are required.

The user device 226a may also include other modules 358, which support supplementary device operations that interact with the configuration data. These modules may include software for monitoring user device performance, enforcing local security policies, or providing user-specific settings. The other modules 358 work in coordination with the user device agent 350 and the system configuration database 356 to ensure consistency and compliance with the organizational policies defined by the management platform 110.

Figure 4:
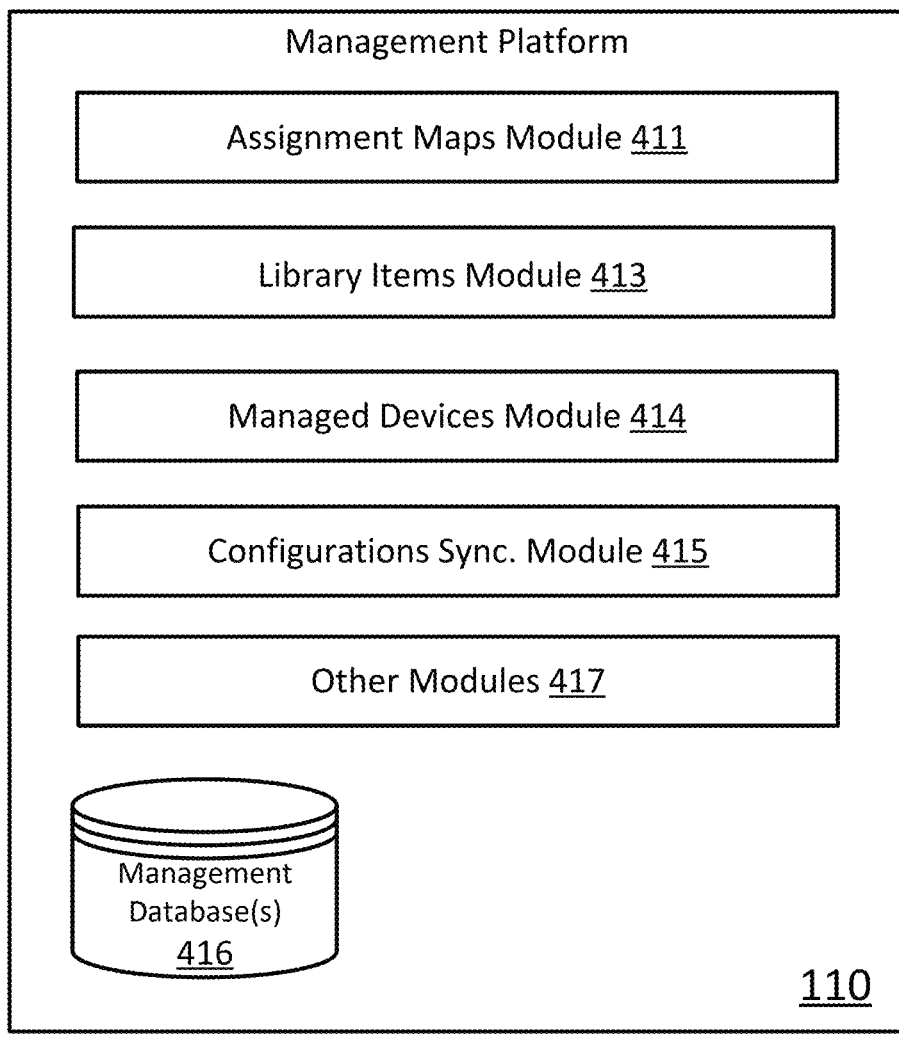
FIG. 4 shows a simplified example of a management platform of the operational environment in FIG. 1, in accordance with some examples.

In accordance with some aspects, FIG. 4 illustrates a simplified portion of an example management platform 110. The management platform 110 is responsible for generating, managing, and distributing configuration data to user devices, such as the user device 226a depicted in FIG. 3, in accordance with some examples. The management platform 110 serves as a de-centralized hub for defining and processing Assignment Maps, resolving conflicts, and ensuring configurations are effectively deployed and enforced across the network platforms 120a-120n of managed user devices.

The management platform 110 includes an Assignment Maps module 411, which facilitates the creation and management of Assignment Maps via a graphical user interface generated by the management platform 110 and which is accessed by administrators (e.g., at the administrator device 224) using a web-portal and/or a downloadable application. In the latter example, all or a portion of the Assignment Maps module 411 may be implemented as part of the downloadable application. The Assignment Maps module 411 enables the definition of conditional logic blocks and conditional logic nodes (described below) through which administrators may specify configuration conditions and associated Library Items for various user devices or device groups. Assignment Maps may also be specified programmatically through the use of an application programming interface (API).

The Assignment Maps module 411 is responsible for parsing a given Assignment Map, resolving any conflicts between Library Items, and generating the resultant configuration data to be transmitted to the respective user devices.

The Library Items module 413 manages a repository of configurations, applications, security settings, and other deployable assets. Each Library Item can be linked to one or more conditional logic nodes within an Assignment Map. The Library Items module 413 ensures that the latest versions of these configurations are maintained and ready for deployment to user devices of the network platforms 120a-120n.

The Managed Devices module 414 tracks all user devices enrolled with the management platform 110. In some examples, this module maintains device-specific metadata, including device type, user roles, operating system versions, and compliance status. As such, the Managed Devices module 414 provides user device-specific information to the Assignment Maps module 411 to ensure that each user device receives the correct configurations according to that device's characteristics and role within the organization.

The Configuration Sync module 415 is responsible for the distribution of configuration data to associated user devices of the network platforms 120a-120n. This module ensures that configuration updates are efficiently synchronized with the appropriate user devices over a network connection, such as the network 222 shown in FIG. 2. It also monitors the status of synchronization processes, ensuring that updates are applied successfully and that any failures are flagged for remediation.

The management platform 110 may also include other modules 417, which provide supplementary functionality to enhance system performance or user experience. These modules may include analytics tools, auditing systems, or additional administrative controls.

A management database 416 is used to store data essential to the operation of the management platform 110. This includes Assignment Maps, Assignment Map version information, Library Items, user device metadata, and historical logs of configuration changes. The management database 416 ensures that the management platform can maintain an accurate and comprehensive view of the network platform configuration states and support auditability for compliance purposes.

Figure 5A:
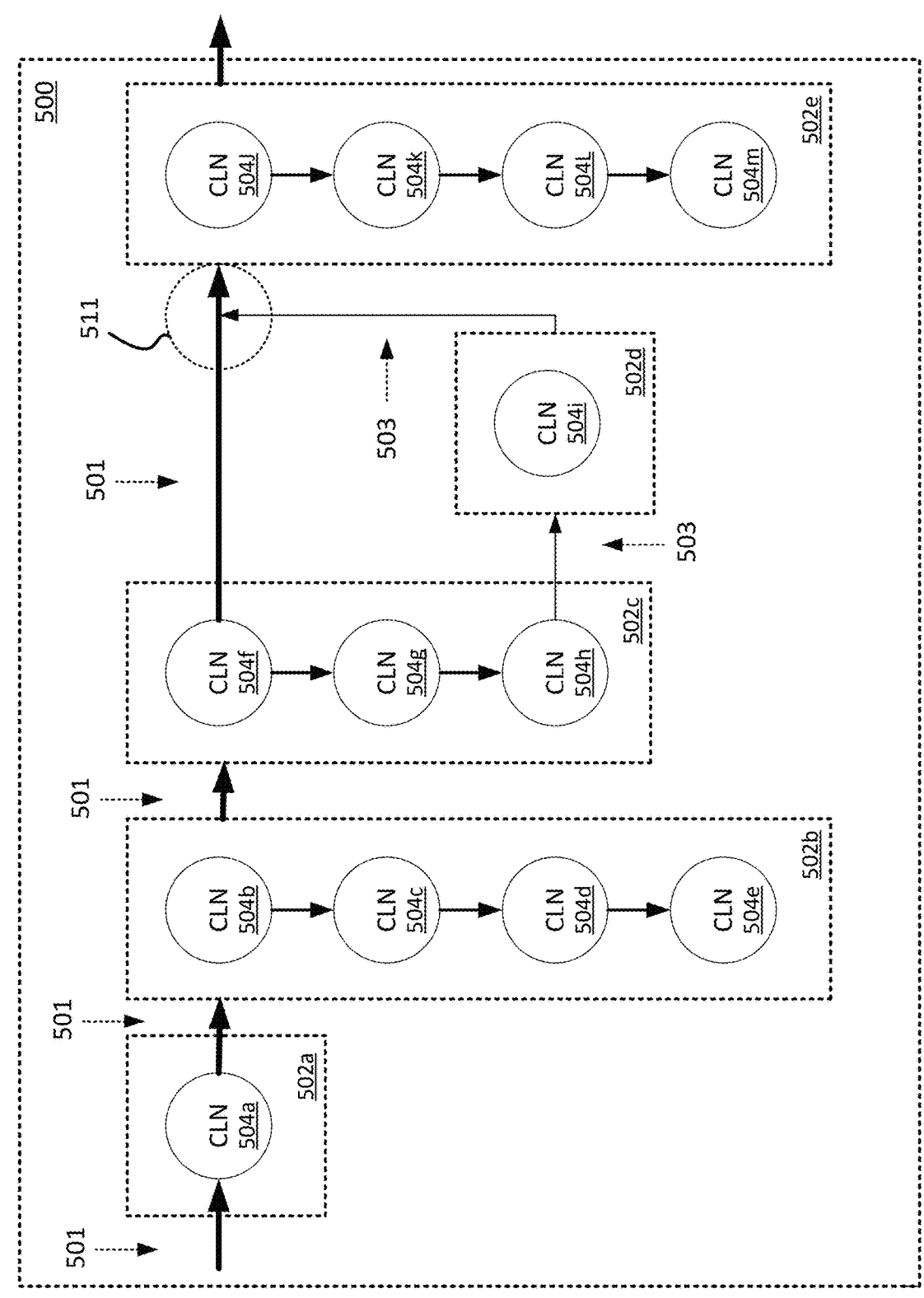
FIGS. 5A-5B illustrate a simplified example of an Assignment Map, in accordance with some examples.
Figure 5B:
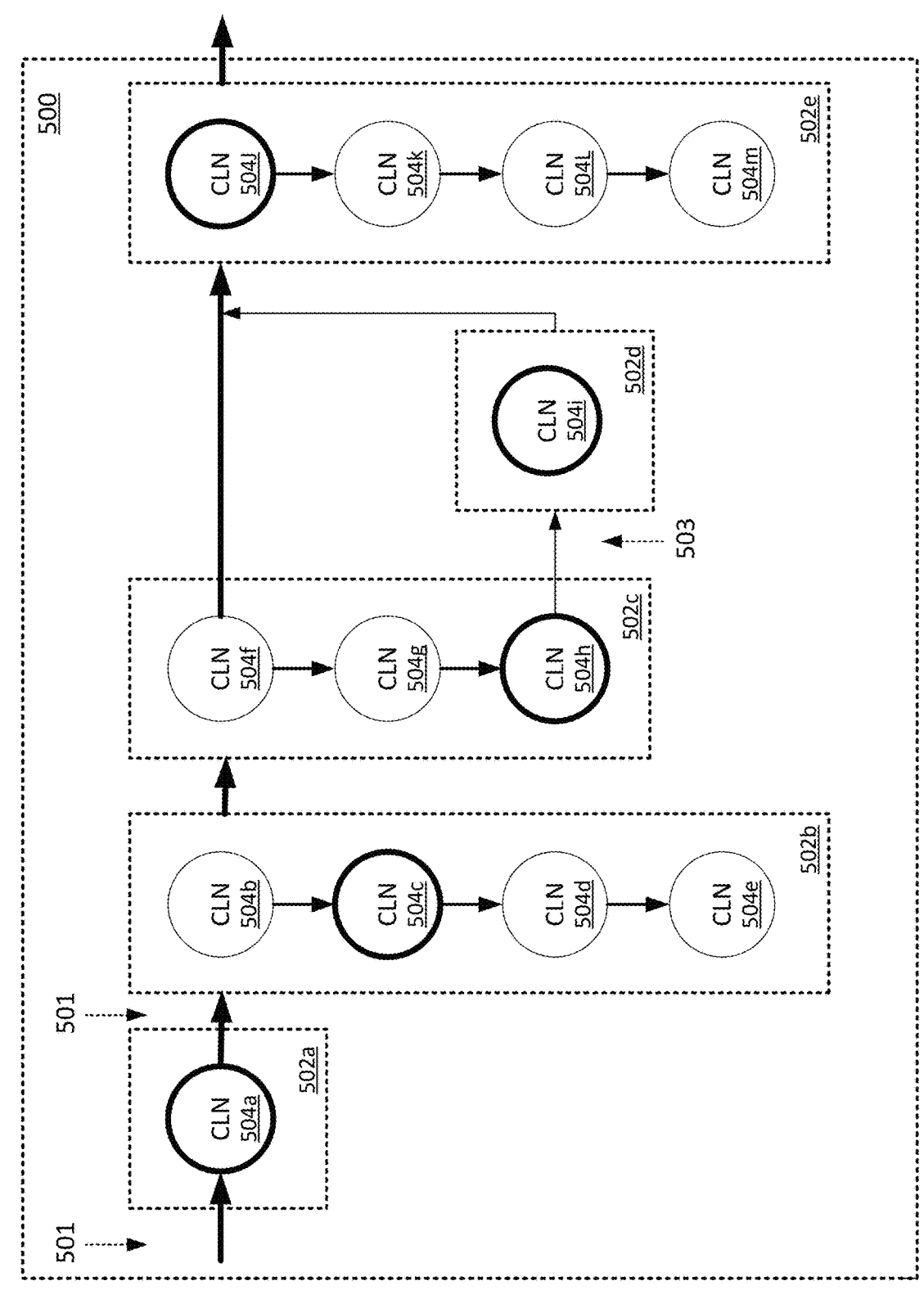
Figure 9A:
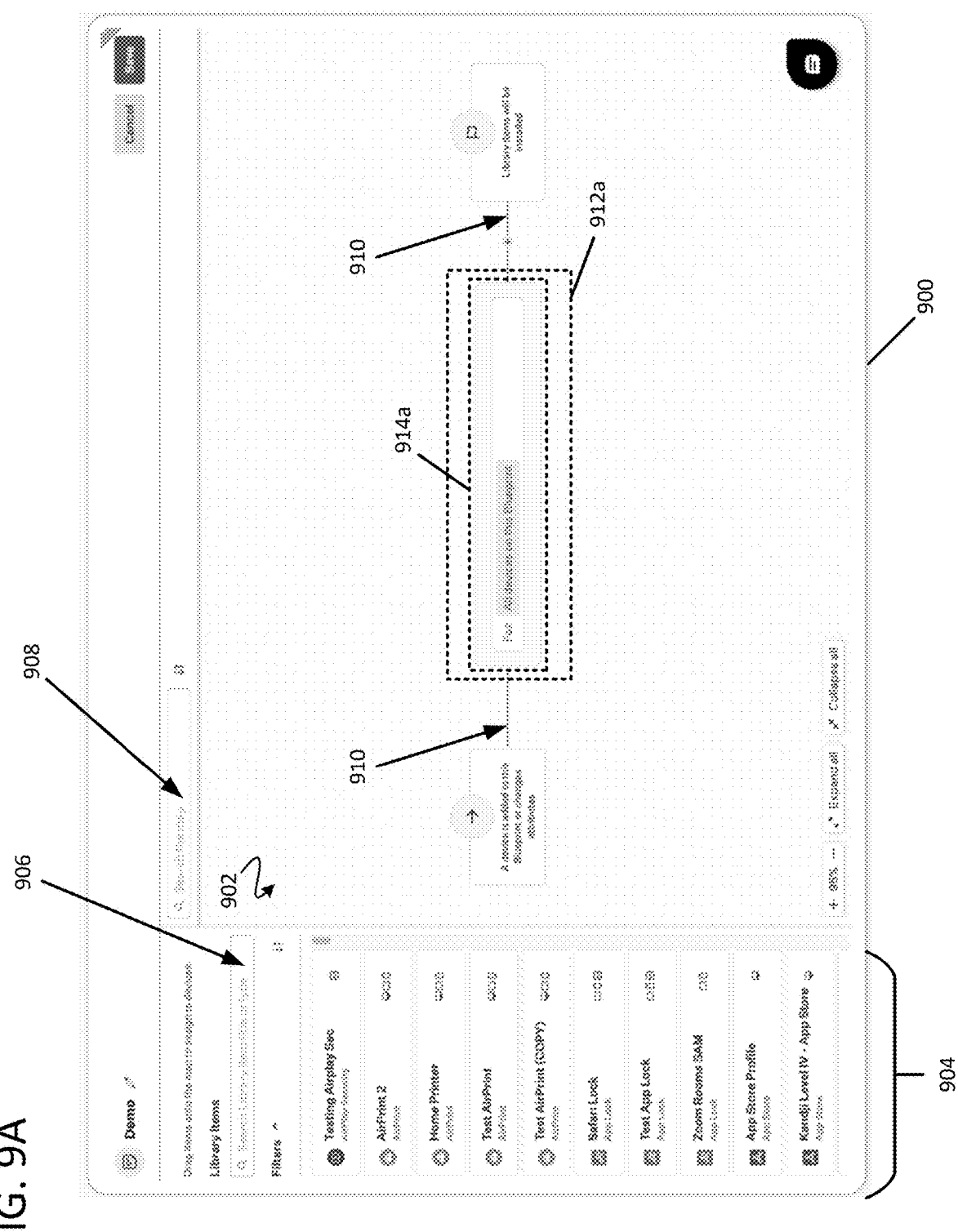
FIGS. 9A-9P show an example implementation of a user interface for the user configuration specification and conflict resolution module, in accordance with some examples.
Figure 9B:
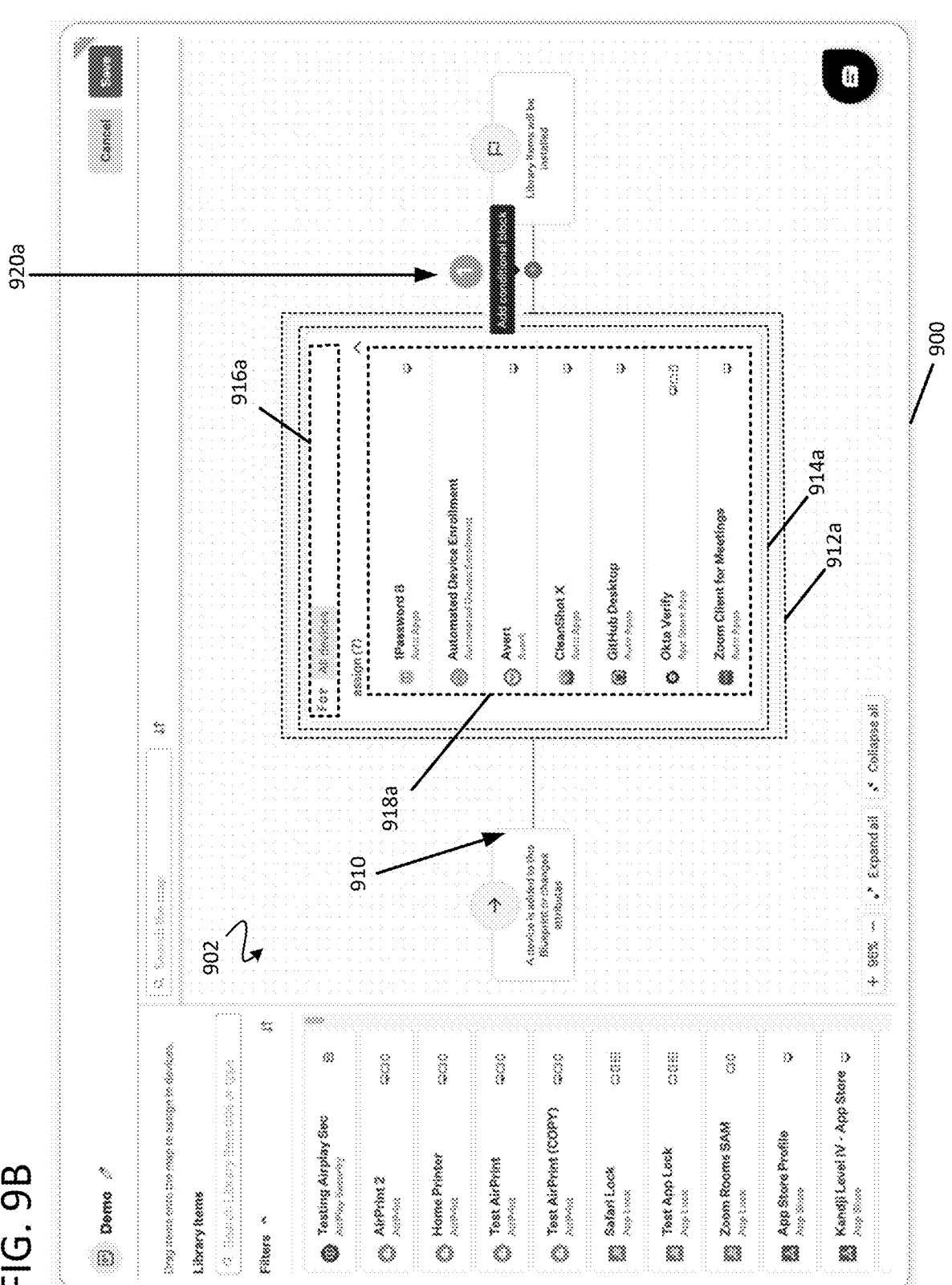
Figure 9C:
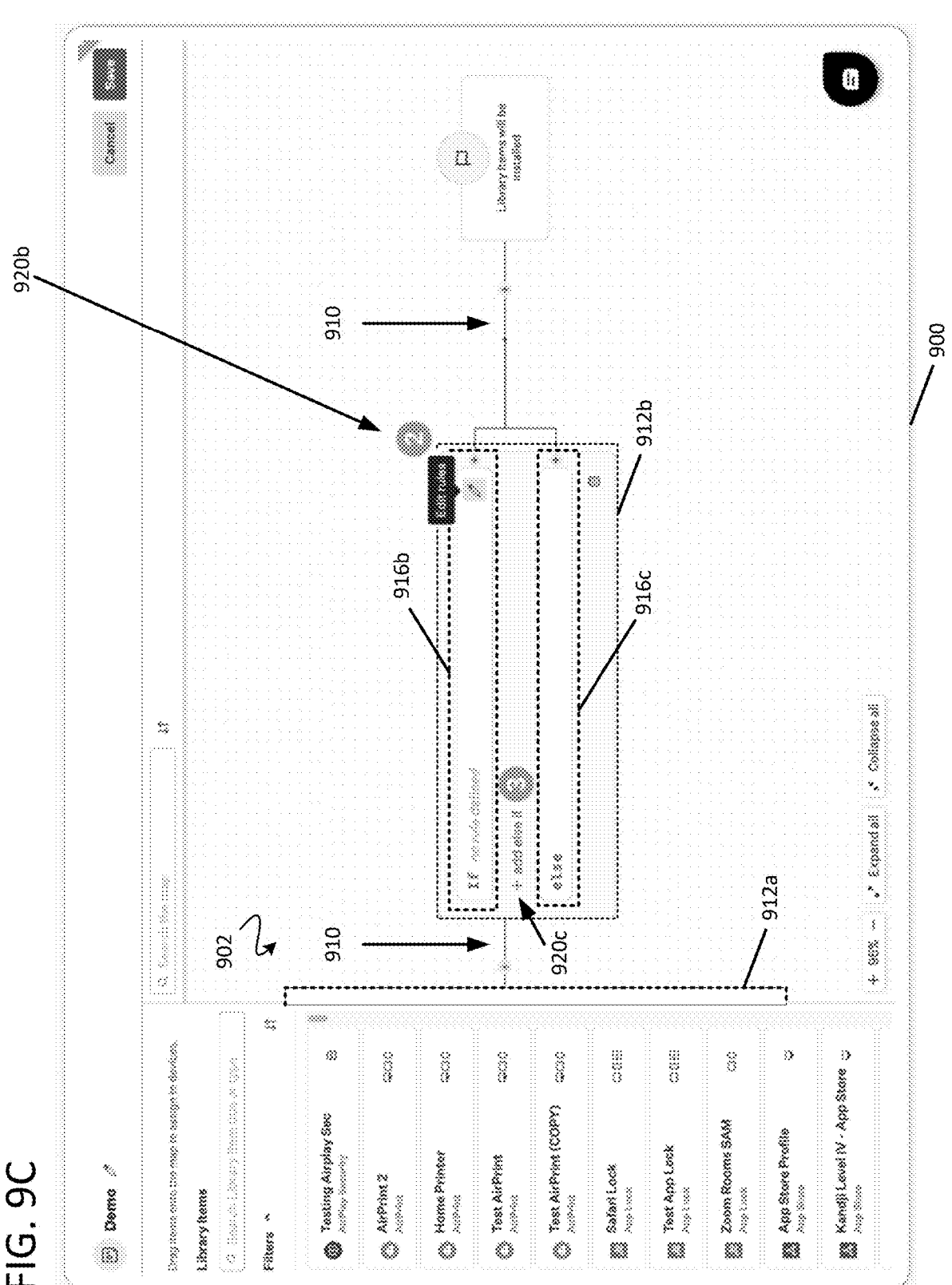
Figure 9D:
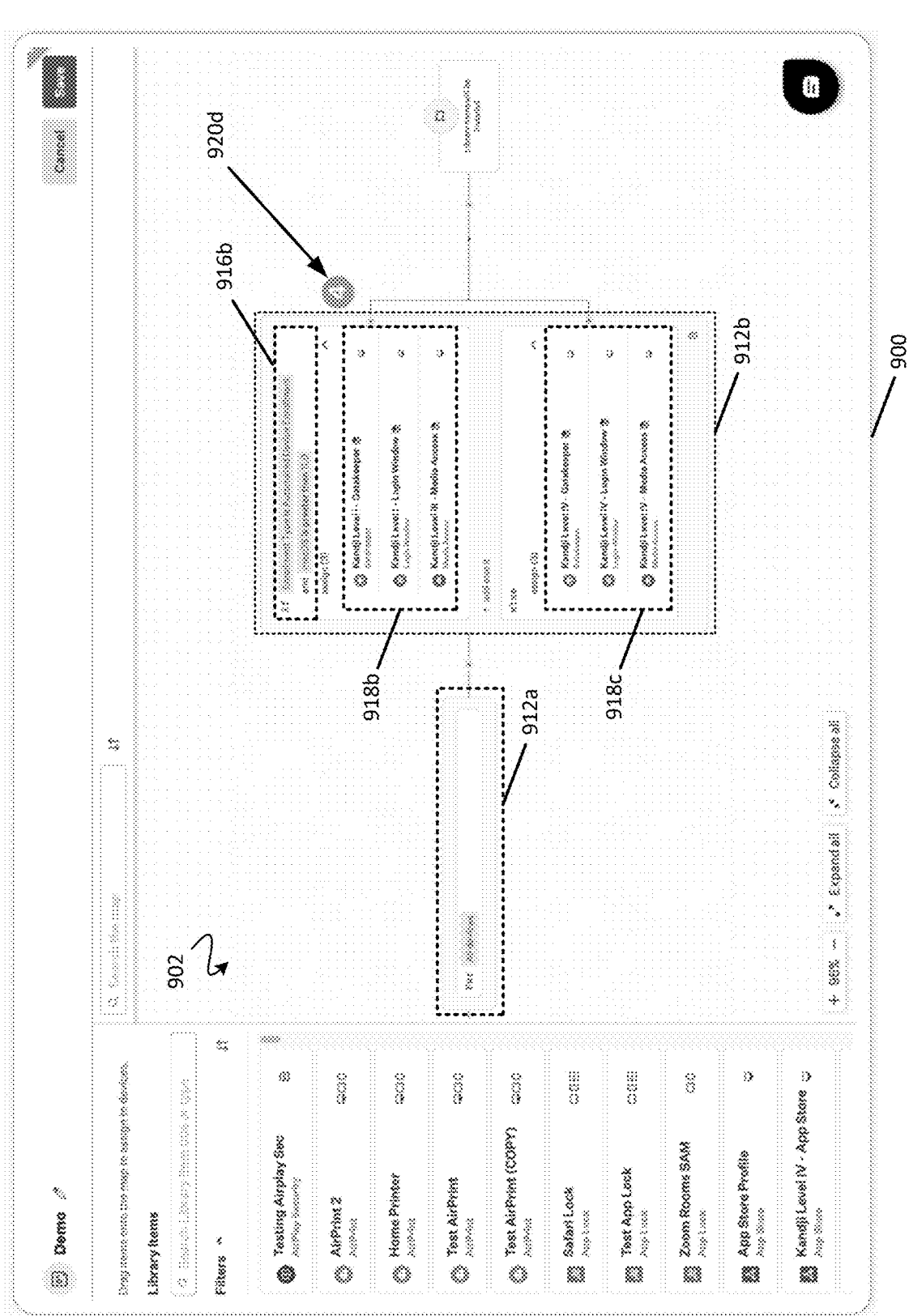
Figure 9E:
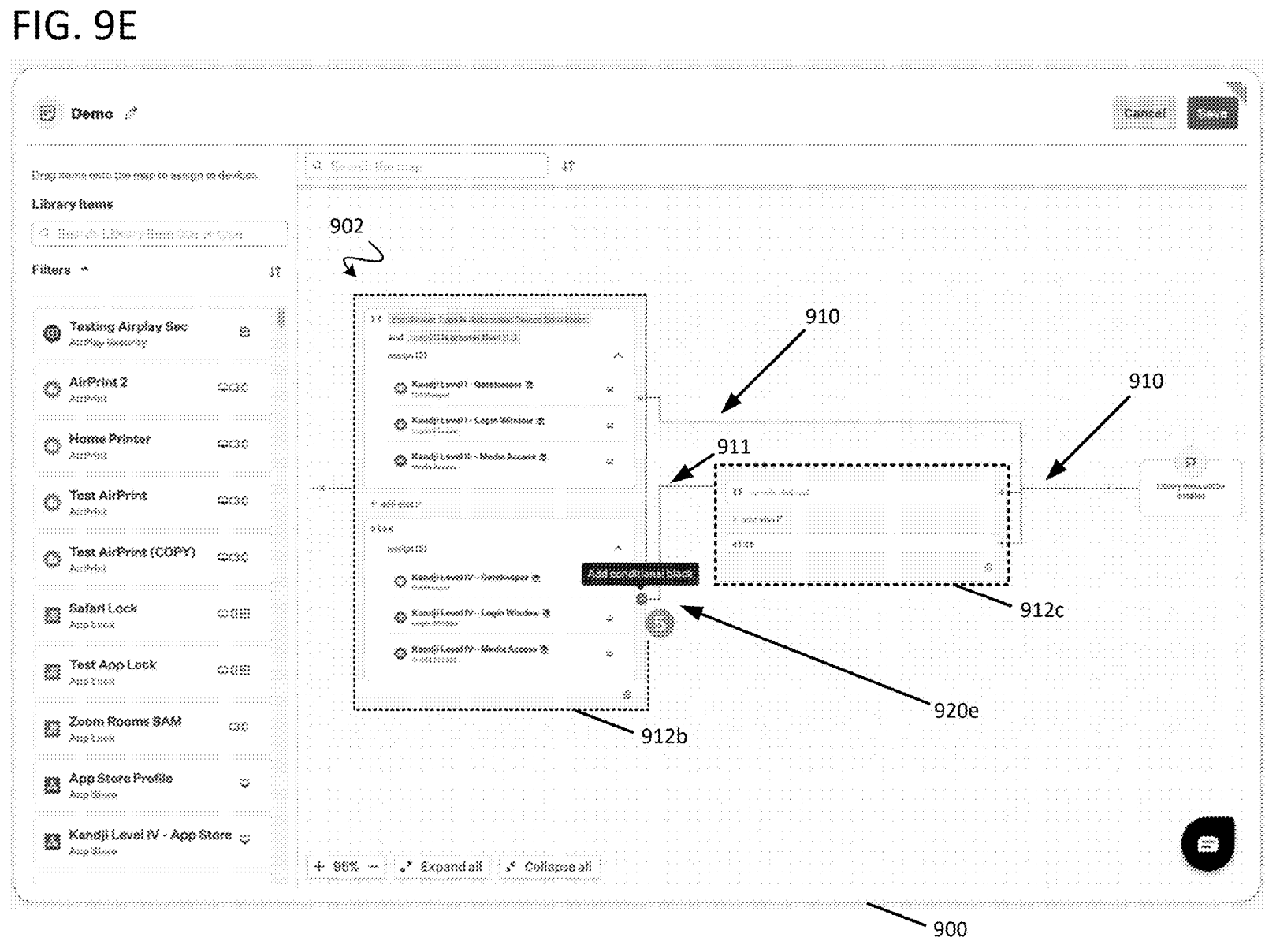
Figure 9F:
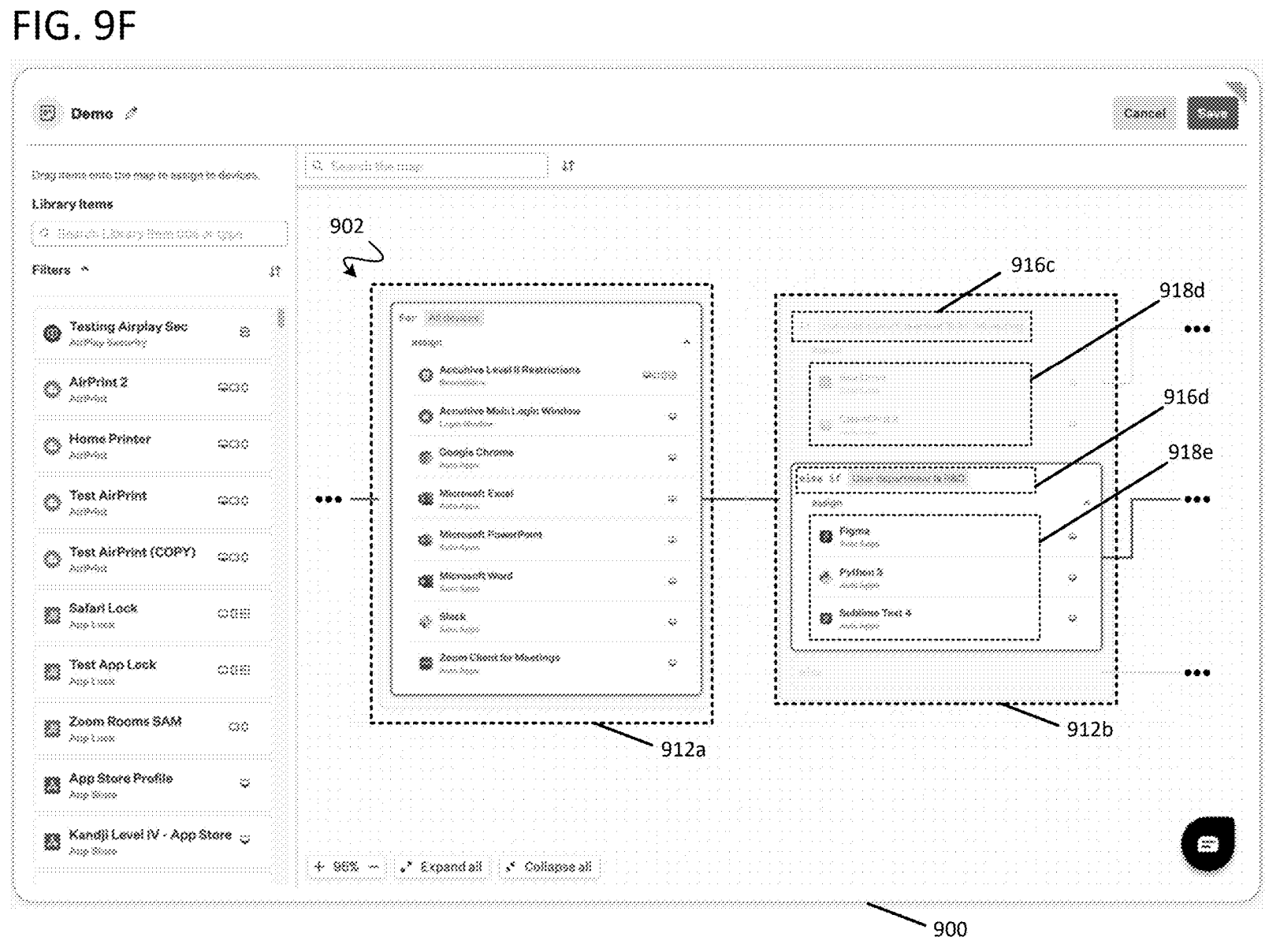
Figure 9G:
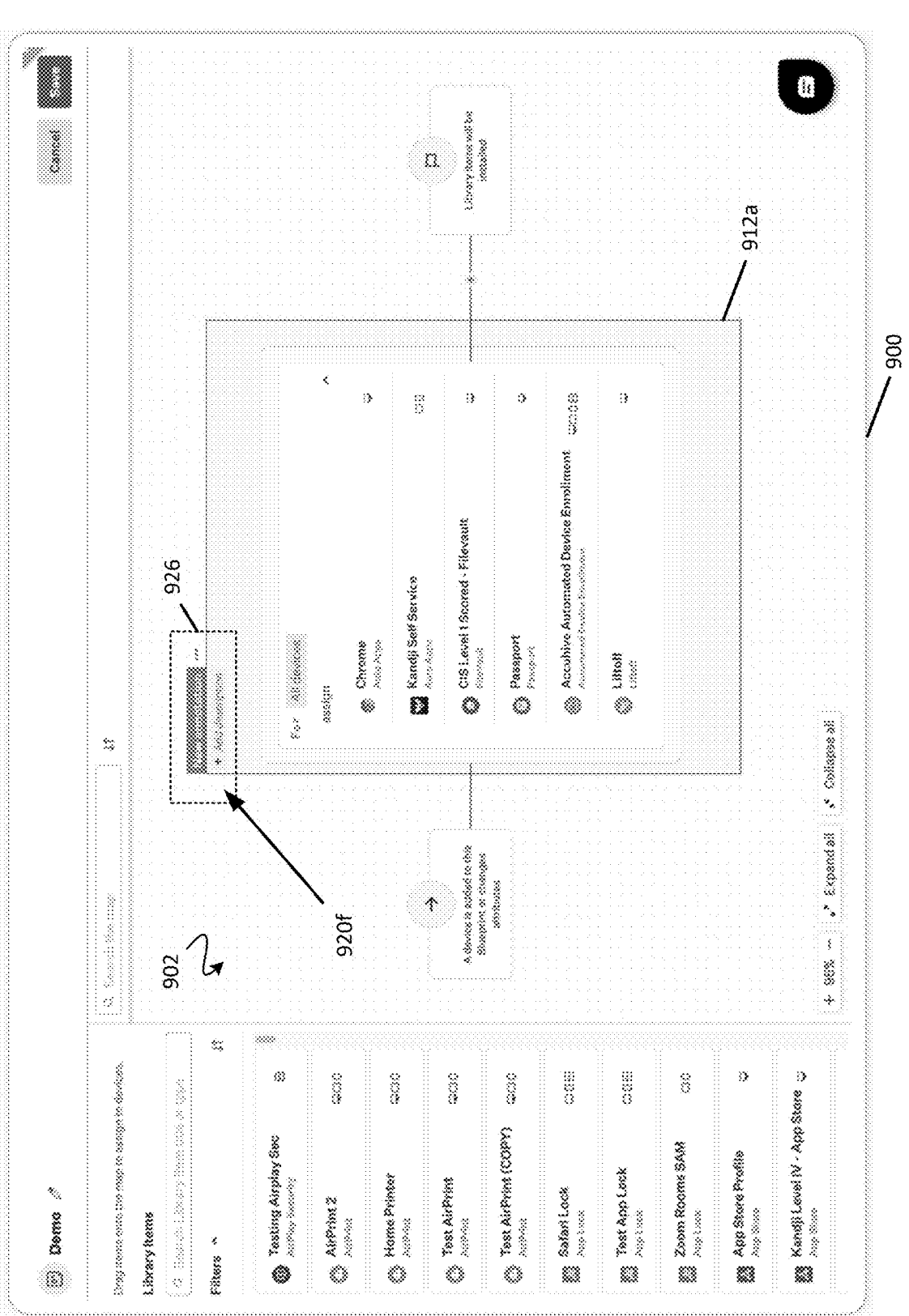
Figure 9H:
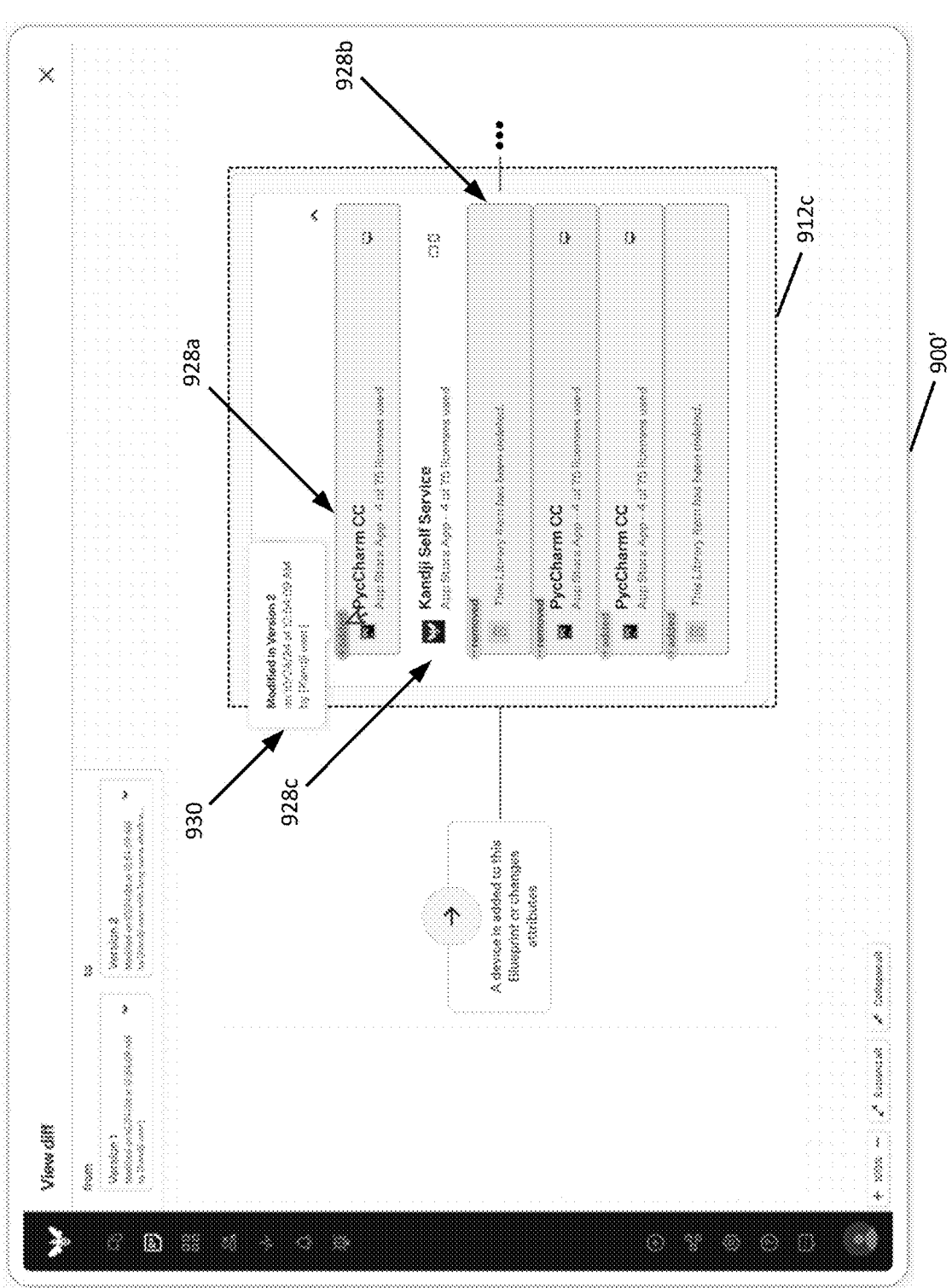
Figure 9I:
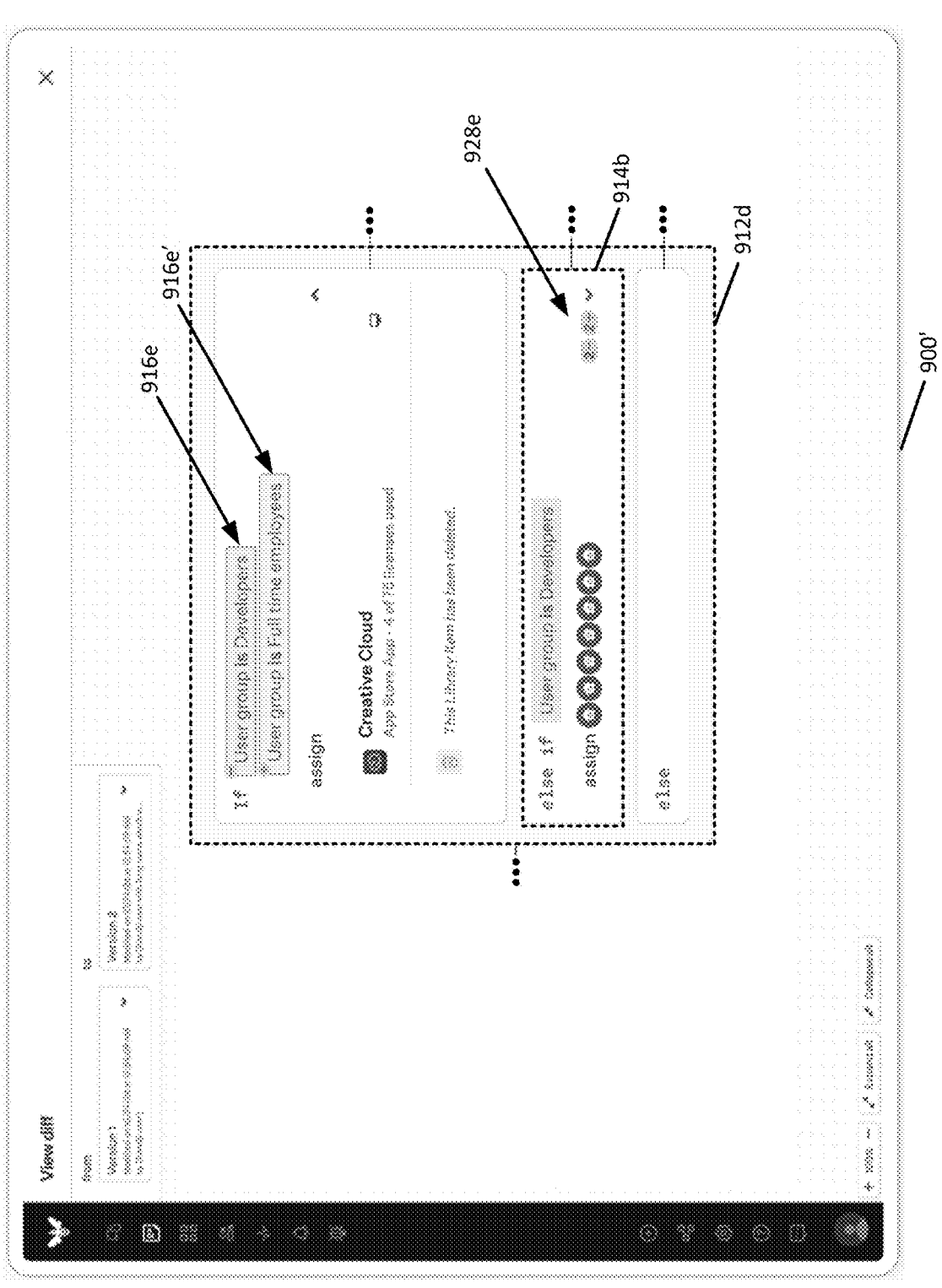
Figure 9J:
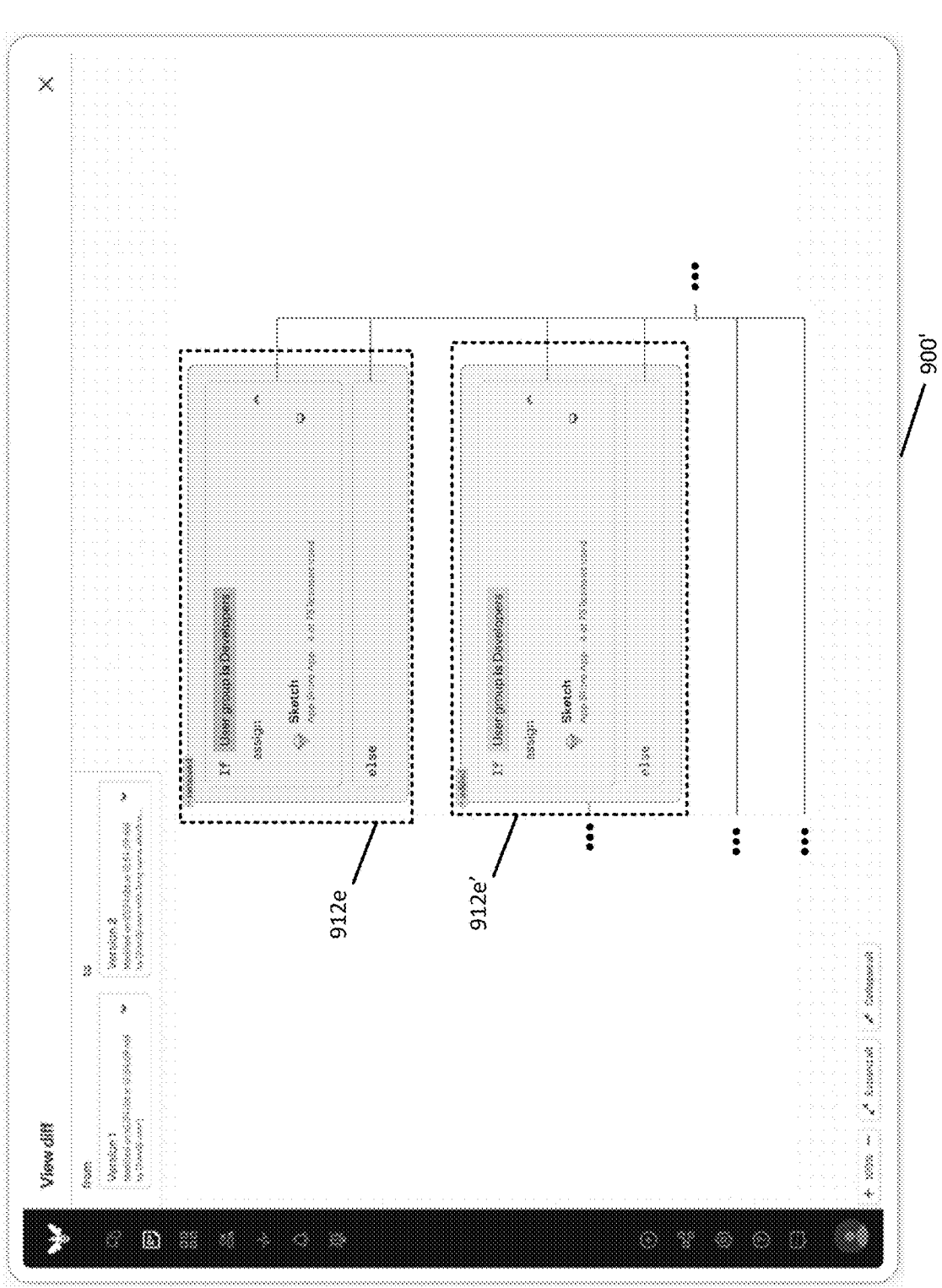
Figure 9K:
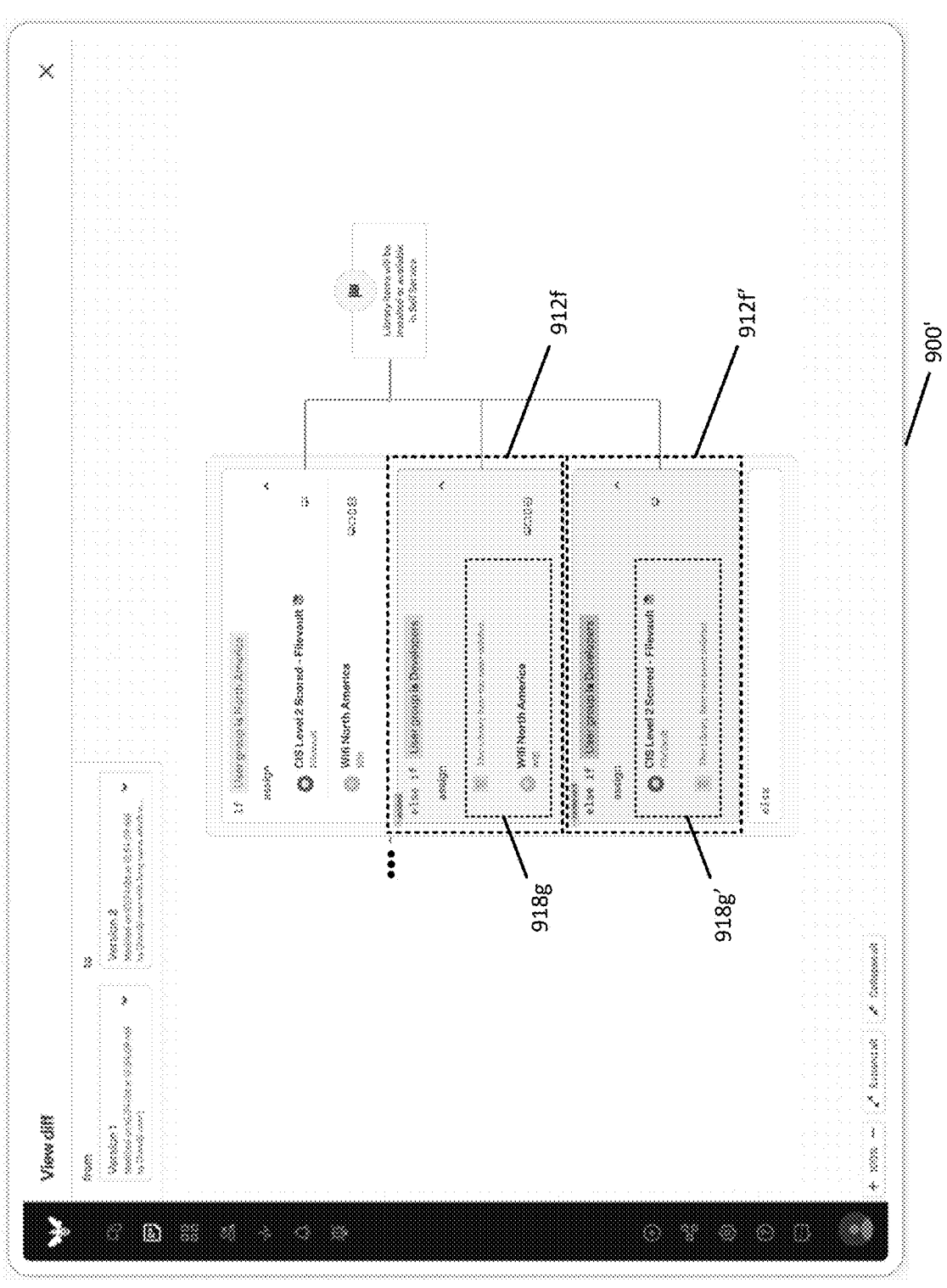
Figure 9L:
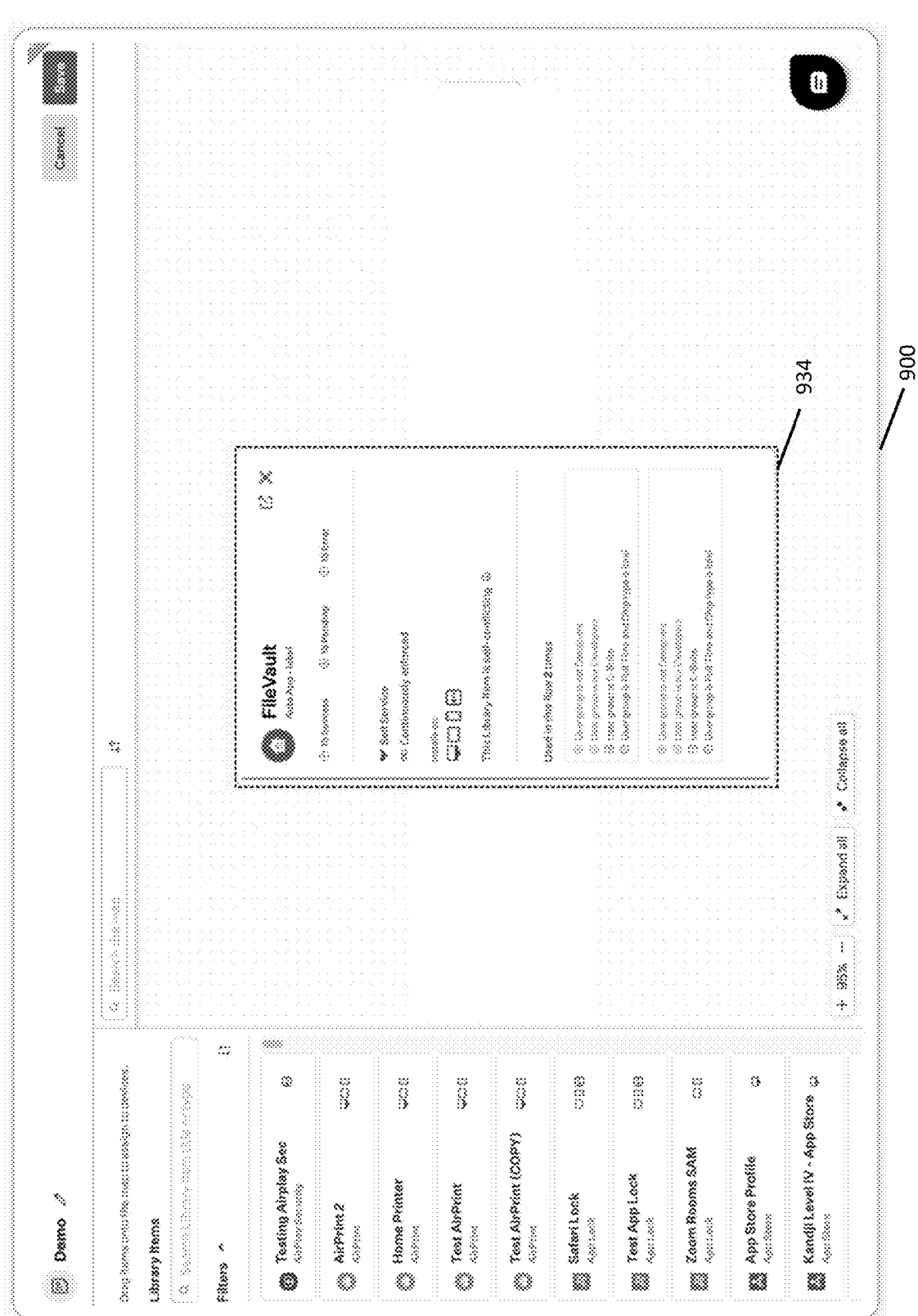
Figure 9M:
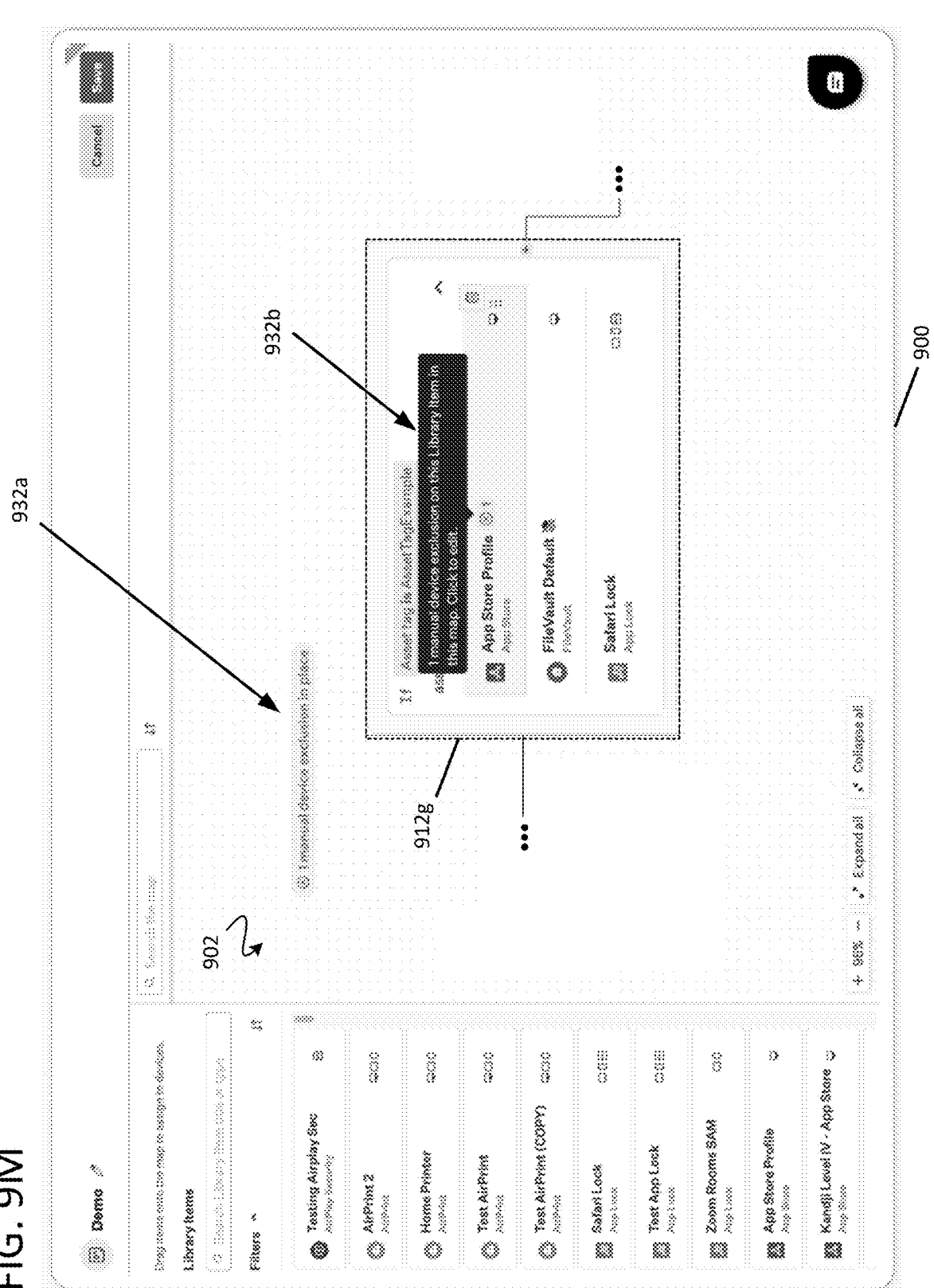
Figure 9N:
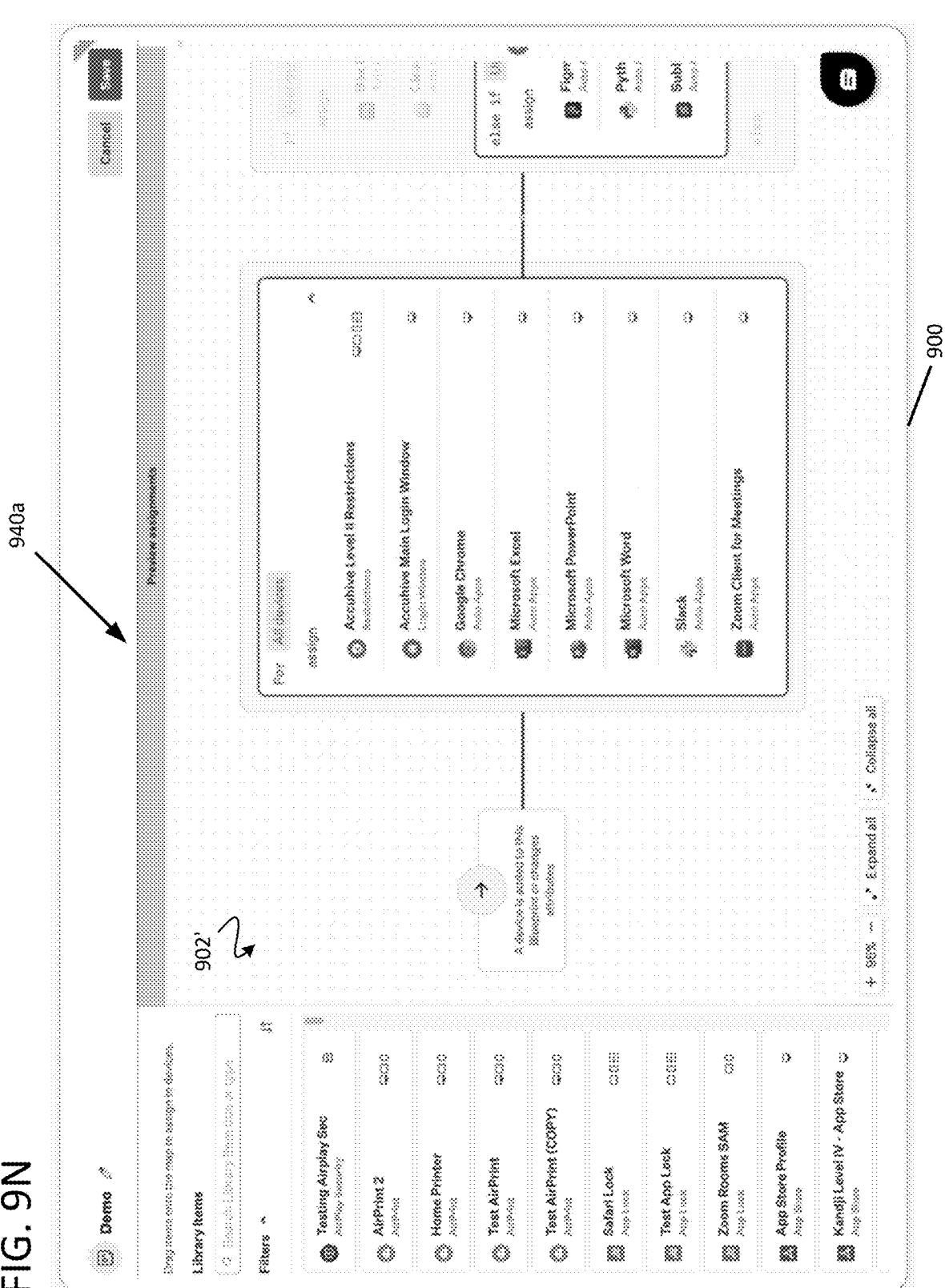
Figure 90:
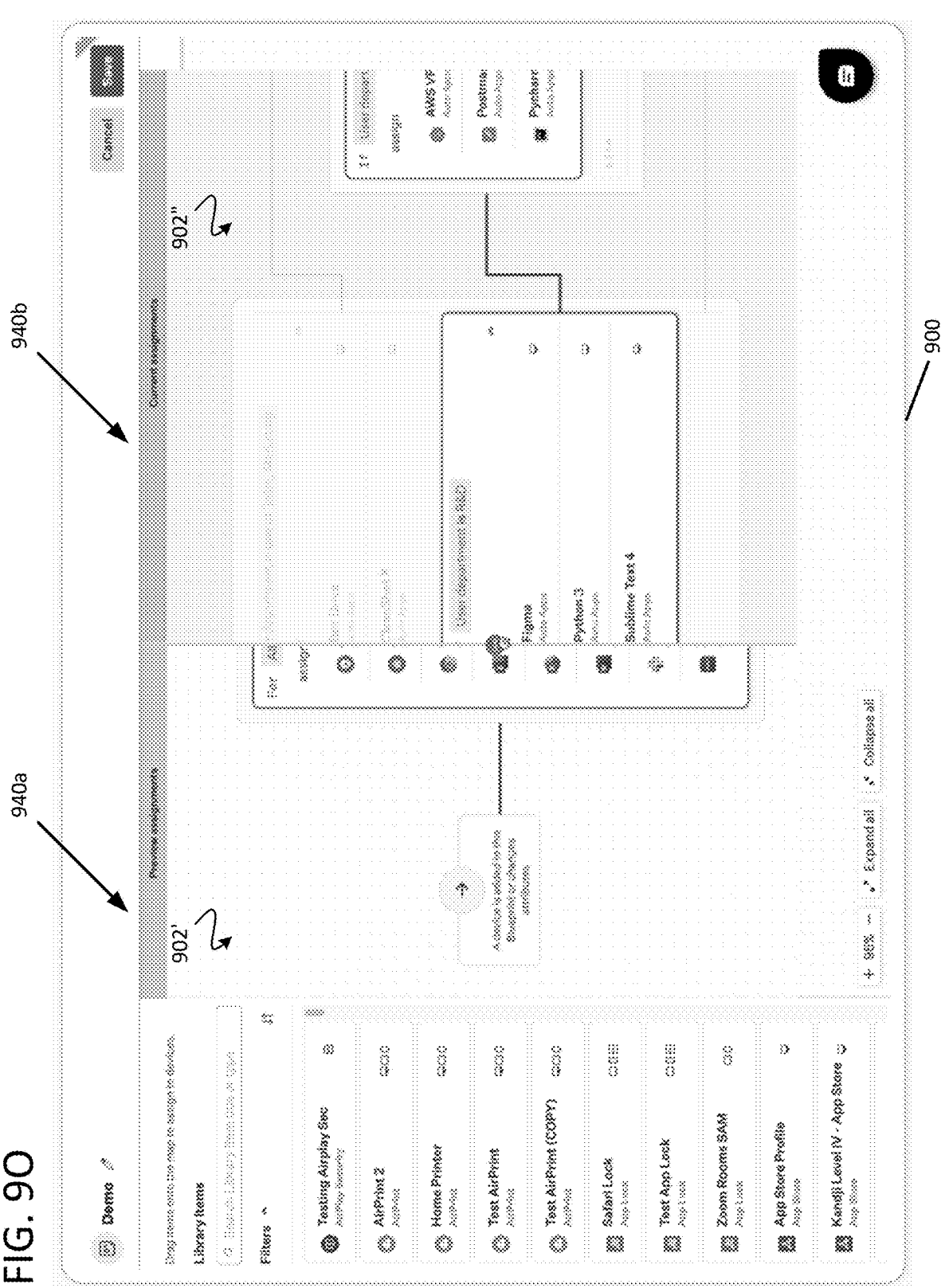
Figure 9P:
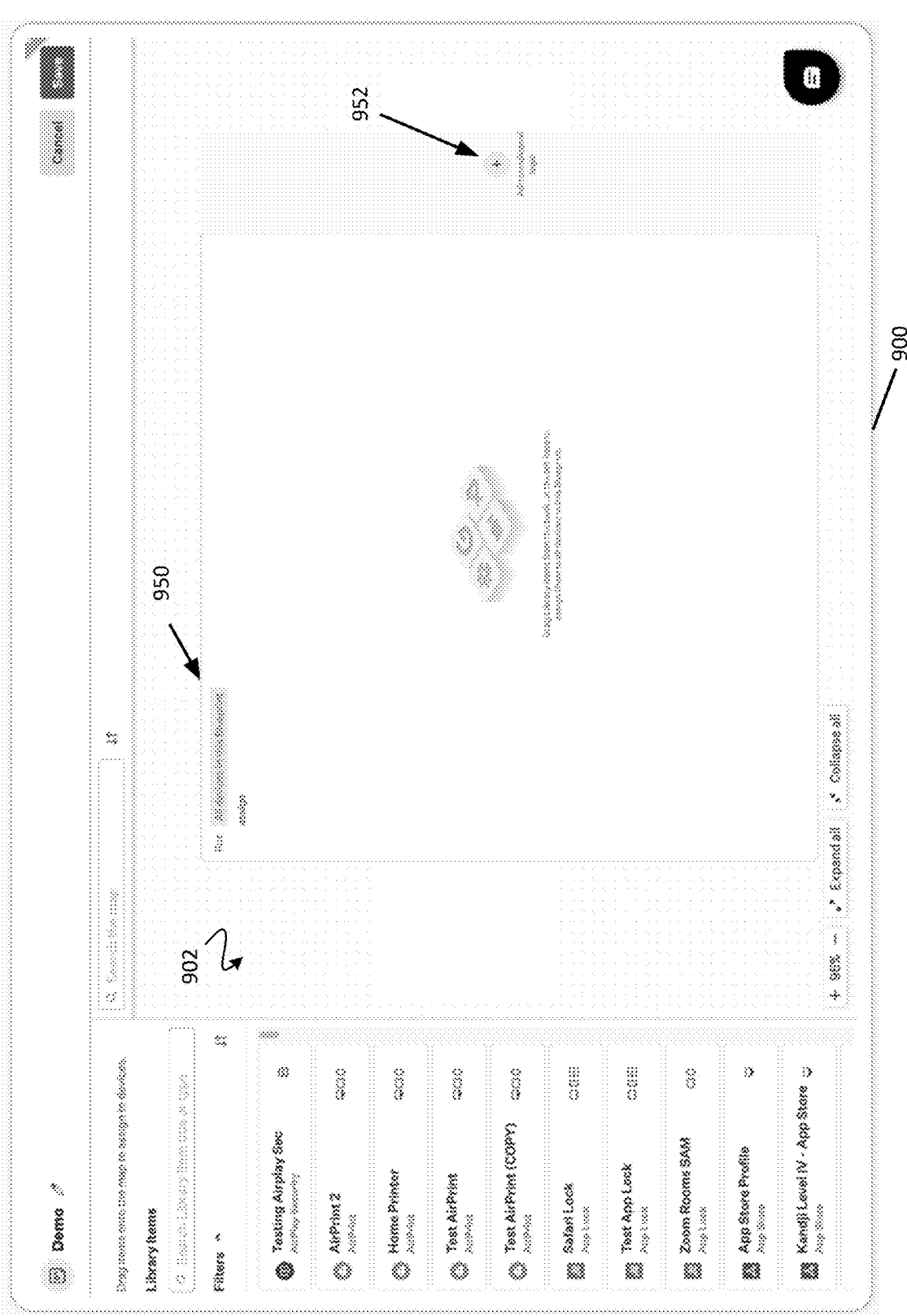

In accordance with some examples, FIGS. 5A-5B illustrate an abstraction of an Assignment Map 500 which is used to define and manage the application of configuration data to user devices based on specified conditions (examples of implemented Assignment Map user interfaces are shown in FIGS. 9A-9P and are discussed in detail below).

The Assignment Map 500 is structured to include multiple conditional logic blocks 502a through 502e, each including one or more conditional logic nodes (CLNs) 504a through 504m. As mentioned above, the Assignment Map 500 facilitates a structured, logical assignment of Library Items to user devices based on the evaluation of conditional statements within the conditional logic nodes by the Assignment Maps module 411.

A root line 501, represented as the topmost thick horizontal arrows, serves as a visual indication for graphically distinguishing the primary evaluation flow of logic within the Assignment Map 500. Each conditional logic block 502a-502e is sequentially evaluated by the Assignment Maps module 411 for each user device based on relative graphical positions of the conditional logic blocks 502a-502e along a root line 501 (e.g., left-to-right, right-to-left, up-to-down, down-to-up). This graphical structure reflects the priority of the conditional logic, with blocks farther to the right (in the example shown) taking precedence when conditions overlap or conflicts arise.

Within each conditional logic block, conditional logic nodes (CLNs) 504a through 504m contain specific conditional logic statements ("assignment rules"), such as "if user is in engineering" or "else if user is in marketing." A conditional logic node may either be associated with no Library Items, or may be associated with one or more Library Items, which are the configurations, applications, or settings that will be deployed to a user device if the conditional statement of the conditional logic node is satisfied (e.g., evaluates to TRUE). For example, if the conditional logic node 504b includes the condition "if user is in engineering," and a user device being evaluated satisfies this condition, the Library Items defined within that conditional logic node (e.g., security policies, installed applications) are applied to the associated user device.

In some examples, a conditional logic node may direct the evaluation flow for an Assignment Map to a set of one or more "nested" conditional logic blocks placed in an evaluation flow that is parallel to the root line. The term parallel is used herein in a broad sense and is not taken to mean strictly geometrically parallel. Such nested logic is graphically distinguished in FIG. 5A by the lower thin arrows 503 that diverge from the root line 501 in a secondary logic evaluation flow and converge back to it after a designated conditional logic block (e.g., the last conditional logic block in the nested set). Because the secondary logic evaluation flow reconverges with the root line at 511, no logical "dead ends" can occur within an assignment map.

Nested logic occurs when a conditional logic block (e.g., 502d) includes additional, subordinate conditions that must be evaluated before proceeding with the primary flow of the root line 501. For example, based on an evaluation of the conditional logic node 504h, the evaluation flow of the Assignment Map 500 may continue to a nested conditional logic block 502d. After evaluating the conditional logic node 504i within the nested conditional logic block 502d, the secondary evaluation flow returns to the primary flow of the root line 501. The nested structure allows for fine-grained decision-making and ensures that Assignment Maps can accommodate complex scenarios where multiple layers of conditions must be satisfied.

In the non-limiting example shown, the evaluation flow within the Assignment Map 500 is organized in a left-to-right, top-to-bottom structure. Conditional logic blocks are arranged horizontally along the root line 501, and nested conditions within each block are evaluated in a top-to-bottom sequence. This systematic flow ensures that configurations are applied consistently and predictably, with higher-priority or more general conditions and their associated Library Items being processed before lower-priority conditions.

By providing a graphical hierarchical and modular structure, the Assignment Map 500 enables administrators to define configurations for user devices in a way that is both flexible, scalable, and re-usable. The use of conditional logic blocks and conditional logic nodes therein enables granular configurations based on specific device or user attributes, while the left-to-right and nested evaluation ensures that even complex conditions can be resolved efficiently.

FIG. 5B illustrates an example evaluation of the Assignment Map 500, highlighting how the Assignment Maps module 411 processes conditional logic blocks (502a-502e) and their respective conditional logic nodes (conditional logic node 504a-504m). In this example, the bolded conditional logic nodes (504a, 504c, 504h, 504i, and 504J) represent conditional logic nodes having conditional logic statements that were satisfied (i.e., they were evaluated as TRUE). The non-bolded conditional logic nodes represent those having conditional logic statements which either are not satisfied (e.g., evaluated as FALSE), or were not evaluated at all due to the evaluation flow of the Assignment Map. That is, as described below, evaluation of a given conditional logic block terminates after the first occurrence of a conditional logic statement within that block being satisfied.

As illustrated in FIG. 5B, upon determining by the Assignment Maps module 411 that the conditional logic statement of a particular conditional logic node within a conditional logic block is satisfied, the evaluation of the Assignment Map 500 proceeds immediately to the next conditional logic block, bypassing any subsequent conditional logic nodes within the current block. This ensures efficient execution of the Assignment Map by avoiding unnecessary evaluations once a satisfied condition has been identified.

For example, within conditional logic block 502b, the Assignment Maps module 411 evaluates conditional logic node 504b first. If the conditional logic statement of conditional logic node 504b evaluates as FALSE, as illustrated, the evaluation proceeds to conditional logic node 504c. In this example, the conditional logic statement of conditional logic node 504c evaluates as TRUE, as indicated by its bold outline. Consequently, the Library Items associated with conditional logic node 504c are applied to the configuration data of the user device being evaluated, and the evaluation flow moves directly to the next conditional logic block, 502c. No further conditional logic nodes within 502b, such as the conditional logic nodes 504d-504c, are evaluated.

This behavior is repeated for subsequent conditional logic blocks. In conditional logic block 502c, conditional logic nodes 504f and 504g evaluate as FALSE, while conditional logic node 504h evaluates as TRUE. Upon determining that the conditional logic statement of conditional logic node 504h is satisfied, evaluation proceeds to the nested conditional logic block 502d (and thereby diverts evaluation flow from the root line 501). Within the nested conditional logic block 502d, the conditional logic node 504i evaluates as TRUE, resulting in the application of its associated Library Items to the user device configuration data, and the evaluation flow continues to the next block 502e. As such, the evaluation flow reconverges to the root line 501.

This process ensures that only one conditional logic statement per conditional logic block is satisfied and executed, with no further evaluation of subsequent conditional logic nodes in the same block. Additionally, nested conditional logic blocks such as block 502d are handled seamlessly, with their flow logic ultimately reconverging with the root line of the Assignment Map. In some examples, a conditional logic node may not be associated with any Library Items and may instead only direct the evaluation flow to a nested conditional logic block or back to the root line.

With reference to FIGS. 5A-5B, FIG. 6 illustrates a portion of an example process 600 for configuring one or more user devices using a user device configuration specification and conflict resolution module (i.e., an "Assignment Maps" module), in accordance with some examples. The particular steps, order of steps, and combination of steps are shown for illustrative and explanatory purposes only. Other examples can implement different particular steps, orders of steps, and combinations of steps to achieve similar functions or results.

At step 602, the Assignment Maps module 411 of the management platform 110 graphically renders an Assignment Map canvas for specifying an Assignment Map associated with one or more user devices (e.g., through a web-portal or an application installed at a remote terminal). The Assignment Map canvas is a graphical workspace into which administrators may place, edit, and arrange one or more conditional logic blocks, each of which may have one or more conditional logic nodes. In some examples, the user devices considered by the Assignment Maps module 411 are specified within an Assignment Map. In other examples, the user devices considered by the Assignment Maps module 411 may be selected by an administrator using a graphical user interface. In still yet other examples, the user devices considered by the Assignment Maps module 411 may be selected programmatically based on knowledge by the management platform 110 of which user devices within an organization are managed. A rendered representation of an Assignment Map within the Assignment Map canvas is part of a graphical user interface that provides a framework for administrators to define conditional logic blocks, conditional logic nodes, and associated Library Items, thereby allowing for precise configuration for user devices based on organizational requirements. Example implementations of a user interface for specifying Assignment Maps are shown and described with reference to FIGS. 9A-9P.

At step 604, the Assignment Maps module 411 receives user input (e.g., from an administrator using a graphical user interface) specifying one or more conditional logic blocks for creating an Assignment Map within the Assignment Map canvas. As was shown and described with reference to FIGS. 5A-5B, each conditional logic block includes one or more conditional logic nodes (CLNs) that define specific conditions (e.g., user device type, user role, user group membership, etc.) for applying configurations.

At step 606, for each of the one or more conditional logic nodes within the conditional logic blocks specified in step 604, the Assignment Maps module 411 receives user input specifying conditional logic statements ("assignment rules", described below) and/or Library Items to be associated with that node. It is possible to simply direct an evaluation flow of the Assignment Map using a conditional logic node, in which case no Library Items are applied to a given conditional logic node. Library Items, managed by the Library Items module 413, may include or specify software applications, security settings, and network configurations, among other examples. The Library Items are linked to respective conditional logic nodes, thereby ensuring that configurations are appropriately applied to user devices that meet the specified conditions.

Next, steps 608 and 610 may occur concurrently or iteratively (as shown by a process flow line returning to step 608 from step 610). In some examples, steps 608 and 610 may occur concurrently with steps 604 and 606 as an administrator is specifying an Assignment Map (i.e., conflicts are identified and resolved as a user builds an Assignment Map). In other examples, steps 608 and 610 may occur after a user has completed an Assignment Map specification (i.e., conflicts are identified and resolved after a user has saved or committed an Assignment Map).

At step 608, the Assignment Maps module 411 generates a respective device configuration for each user device of the one or more user devices by evaluating the defined Assignment Map. This involves sequentially evaluating the conditional logic blocks and conditional logic nodes therein based on a relative graphical position thereof, and against user device metadata and organizational information stored in the Managed Devices module 414.

Based on this evaluation, the Assignment Maps module 411 creates respective, specific, configuration data for each user device, ensuring compliance with the administrator's intent and organizational policies.

At step 610, the Assignment Maps module 411 identifies, displays, and/or resolves any conflicts among Library Items within the Assignment Map. In some examples, conflict resolution may instead occur as part of step 608, and steps 608 and 610 are thereby combined.

Conflicts can occur when multiple conditional logic nodes target the same user device with overlapping or contradictory Library Items. For example, a conflict might arise if one conditional logic node specifies that a security policy enabling file encryption is to be applied to all user devices in the "Engineering" department, while another conditional logic node specifies that file encryption is to be disabled for all user devices running a specific operating system version, and a user device in the "Engineering" department meets both conditions. In some examples, such conflict identification and/or resolution occurs while the Assignment Maps module 411 evaluates the defined Assignment Map, and conflicts are automatically remediated as the evaluation flow moves along the root line in the Assignment Map. In other examples, all or a portion of conflict identification and/or resolution may occur as a pre-evaluation stage, in which the Assignment Maps module 411 alerts an administrator to a possible conflict within the Assignment Map as the administrator specifies Library Items within conditional logic nodes.

For example, in one possible approach, the process of conflict identification begins when the Assignment Maps module 411 evaluates the conditions defined by the conditional logic nodes against the metadata stored in the Managed Devices module 414. For each user device, the module checks for multiple conditional logic nodes that resolve to "TRUE" for the same device attribute(s) and verifies whether the associated Library Items impose contradictory or incompatible settings. In the example above, the module would identify that the same device is subject to contradictory security policies based on its department and operating system.

In some examples, conflicts may be identified by the Assignment Maps module 411 while a user is still generating an Assignment Map and without any knowledge of any user devices. Such conflict identification may be determined based on user-specified logic within an Assignment Map and/or associated Library Items.

In another approach, a reference to each Library Item to be applied to an associated user device is stored within a respective configuration data structure for that user device at a location associated with a particular Library Item class or type. As each Library Item reference is added by the Assignment Maps module 411 to a user device's configuration data structure, a Library Item having a class or type that is already present in the data structure will overwrite a previously stored Library Item. As but one example implementation, the configuration data structure may comprise a dictionary object or database object having a single entry for each Library Item type. As a new Library Item is added to the dictionary or database object, it will overwrite an existing entry of the same class or type.

For example, a configuration data structure may include an entry to store or reference a user device application security policy. As an evaluation flow by the Assignment Maps module 411 moves through a given Assignment Map, the user device application security policy entry within the data object is overwritten each time a new security policy is assigned to the user device by the Assignment Maps module 411.

In any of the approaches described above, once a conflict is identified, the Assignment Maps module 411 may display the conflict to the administrator within the Assignment Map interface, providing details about the overlapping conditional logic nodes, the associated Library Items, and the conditions that triggered the conflict. This enables the administrator to review and manually resolve the conflict if necessary.

As described above, based on the approach taken for conflict resolution, if the administrator does not manually resolve the conflict, in some examples the Assignment Maps module 411 may implement an automated conflict resolution strategy. This strategy uses the graphical positional hierarchy of the conditional logic nodes within the Assignment Map, with conditional logic nodes farther along the root line taking precedence over those evaluated earlier along the root line. In the above example, if the conditional logic node disabling file encryption graphically appears to the right of the conditional logic node enabling it, the Assignment Maps module 411 resolves the conflict by overwriting previously stored data with a "disable file encryption" policy in the configuration data for the user device.

Additionally, in some examples the Assignment Maps module 411 may implement advanced conflict resolution rules to handle more complex scenarios. These rules can prioritize conditional logic nodes based on specific attributes, such as the specificity of the condition, administrator-defined priorities, or organizational policies. For example, the Assignment Maps module 411 may prioritize conditional logic nodes that reference a specific operating system version over those that apply to a broader device group. These measures ensure that the resulting configurations for a given user device are consistent and enforceable while preserving the intent of the administrator's Assignment Map definitions.

At step 612, which is optional, the Assignment Maps module 411 displays the finalized configuration details for each of the evaluated user devices. This optional step provides administrators with a visual summary of the generated configurations, allowing for final review or modification before committing the Assignment Map for the deployment of resultant configuration data to the associated user devices, or after committing the Assignment Map but before deployment to associated user devices. In some examples, "committing" an Assignment Map may involve saving the Assignment Map, or otherwise indicating to the Assignment Map module 411 that a given Assignment Map is ready for additional processing, such as saving, parsing, generating configuration data, and/or transmitting generated configuration data to one or more associated user devices.

At step 614, the Configuration Sync module 415 causes the respective device configurations to be applied to the one or more user devices. This step involves transmitting the generated configuration data to the device agent modules 352 of the respective user devices, such as user device 226a. Upon receipt, the user devices implement the configurations as specified, ensuring alignment with the organizational policies defined in the Assignment Map.

To elaborate, by evaluating the conditional logic blocks within the Assignment Map, the management platform 110 generates configuration data for each user device that was considered. The respective configuration data includes the Library Items selected for each user device and ensures that no conflicts exist between the Library Items, as any conflicts have been resolved during the evaluation process. In some examples, the management platform 110 transmits the configuration data to each associated user device via a secure communication channel, such as HTTPS or another encrypted protocol. The device agent 350 operating on the user device, processes the received configuration data and applies the Library Items specified therein.

For example, the device agent 350 may install applications, enforce security policies, or apply network configurations as dictated by the configuration data. In some examples, once the configuration data has been applied to the user device, the user device generates feedback data and transmits it to the management platform 110. The feedback data may include success indications, failure indications, and/or status logs. The management platform 110 may further use the feedback data to update a graphical user interface, thereby enabling administrators to monitor the configuration status of user devices in real-time.

Figure 7:
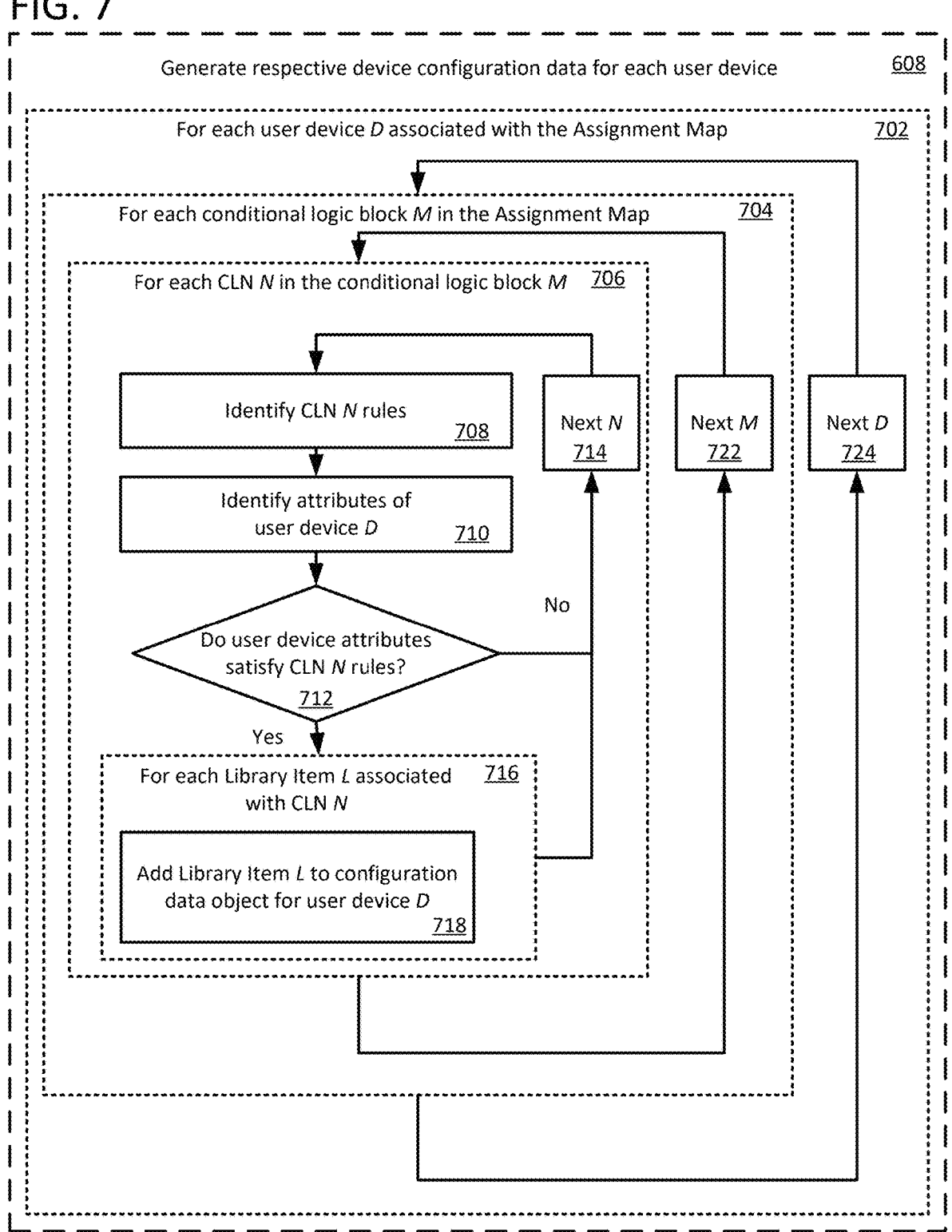
FIGS. 7-8 provide details for portions of the process for user device configuration and conflict resolution using Assignment Maps as introduced in FIG. 6, in accordance with some examples.

FIG. 7 illustrates an example implementation of step 608 of the process 600 introduced with reference to FIG. 6, in accordance with some examples. The particular steps, order of steps, and combination of steps are shown for illustrative and explanatory purposes only. Other examples can implement different particular steps, orders of steps, and combinations of steps to achieve similar functions or results.

At step 702, the Assignment Maps module 411 begins the process of generating user device configuration data by iterating over each user device D associated with the Assignment Map to determine configuration data for that device.

As part of step 702, at step 704, for the current user device D, the Assignment Maps module 411 iterates through each conditional logic block M in the Assignment Map in an order dictated by relative graphical positions therebetween along a root line and/or secondary evaluation flow of the Assignment Map. Similarly, within each conditional logic block M, at step 706 the Assignment module evaluates that block's conditional logic nodes in an order dictated by relative graphical positions therebetween (e.g., top-to-bottom, left-to-right) to determine which Library Items, if any, should be applied to the current user device D being considered.

As part of step 706, at step 708, the Assignment Maps module 411 identifies the assignment rules (e.g., conditional logic statements) associated with the current conditional logic node N being evaluated in the current conditional logic block M. The assignment rules define the conditions that must be satisfied for a conditional logic node such that the Assignment Maps module 411 will apply that conditional logic node's associated Library Items to the user device D.

As a simplified example, a given assignment rule may be associated with the user of the device D, such as "User group is one of database-admins", "User Job Title is Product Engineer", etc. As another example, an assignment rule may be associated with the user device itself, such as "Chip type is ABC", "Device Family is XYZ", etc.

At step 710, the Assignment Maps module 411 identifies attributes associated with the current user device D. These attributes may include metadata such as the user's role, department, the user device operating system, the user device chipset, or other parameters relevant to the evaluation of the Assignment Map. In some examples, the device attributes are stored at and retrieved from the Managed Devices module 414 and/or the management database 416 as metadata.

At step 712, the Assignment Maps module 411 determines whether the identified attributes of user device D satisfy the assignment rules of the conditional logic node N. For example, the Assignment Maps module 411 will evaluate whether the user group information identified in the user device metadata (e.g., Marketing) satisfies the user group specified in the assignment rule (e.g., database-admins).

If the assignment rules are not satisfied, the process moves to step 714, where the Assignment Maps module 411 advances to the next conditional logic node N within the same conditional logic block M and repeats the evaluation for that conditional logic node.

If instead, the assignment rules of the conditional logic node N are satisfied, the process proceeds to step 716, wherein each of the Library Items Z associated with the conditional logic node N are evaluated. For each Library Item L, at step 718 the Assignment Maps module 411 adds that Library Item to the configuration data object associated with user device D.

After all Library Items for the satisfied conditional logic node N are processed, the Assignment Maps module 411 advances to the next conditional logic block M via step 722 (i.e., a given conditional logic block is exited after a first conditional logic node is satisfied). After all conditional logic blocks in the Assignment Map have been evaluated for the current user device D, the Assignment Maps module 411 advances to the next user device via step 724 associated with the Assignment Map, and the process repeats.

This iterative process ensures that all user devices associated with the Assignment Map receive configuration data that is conflict-free and aligns with the rules defined in the Assignment Map.

In some approaches, for each Library Item L associated with the satisfied conditional logic node, the Assignment Maps module 411 performs a conflict check to ensure that no overlapping or contradictory Library Items are applied to the same user device. In other approaches, the newly identified Library Item L overwrites a previously identified Library Item for a given Library Item type or class within the configuration data object, thereby automatically remediating any potential conflicts.

Figure 8:
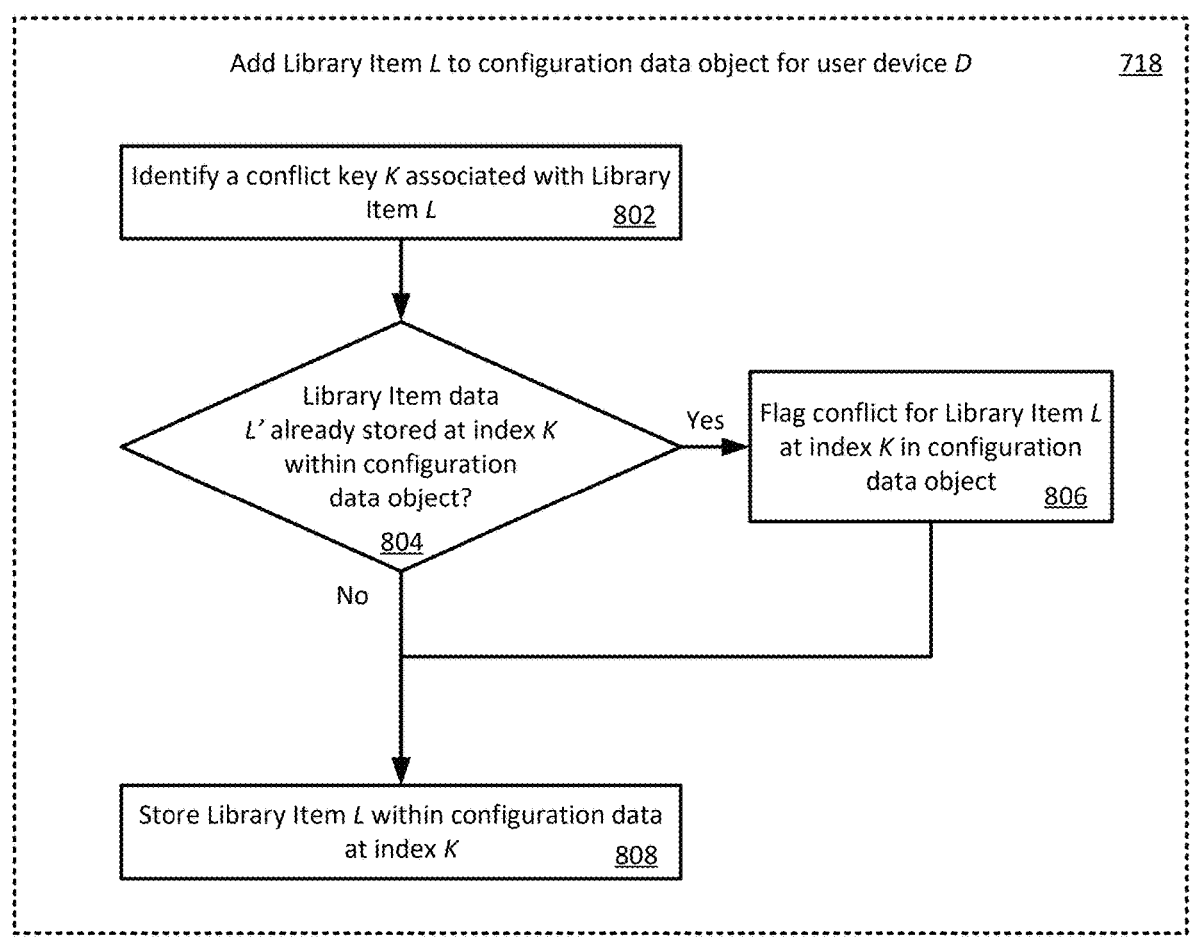

With reference to the latter example, FIG. 8 illustrates an example implementation of step 718 introduced with reference to FIG. 7, in accordance with some examples. The particular steps, order of steps, and combination of steps are shown for illustrative and explanatory purposes only. Other examples can implement different particular steps, orders of steps, and combinations of steps to achieve similar functions or results.

At step 802, the Assignment Maps module 411 identifies a "conflict key" K associated with a class, type, or other attribute of the Library Item L (e.g., using the Library Items module 413). For example, within the Library Items module 413, a variety of Library Items that share a similar and/or mutually exclusive purpose may be assigned the same conflict key by an organization or by the provider of the Management Platform 110. Similarly, variants of a Library Item within the Library Items module 413 may be assigned the same conflict key.

Conflict keys ensure that only specific Library Items are checked for conflicts in an Assignment Map's hierarchy. As an example, the Library Items module 413 may include hundreds of applications in an application catalog that administrators may configure. In some examples, only copies of the same application should conflict with one another. As such, each application is associated with a unique conflict key (i.e., a design tool application from a particular vendor ABC may have a conflict key "vendor-ABC-design-app"). The conflict key naming convention is extensible so that if needed, seemingly unrelated Library Items may be configured to conflict with each other.

Additionally, multiple versions or variants of an application may be managed through the use of conflict keys. For example, for the design application from "vendor ABC" mentioned above, a user in Sales may be allowed to install and update the application as needed and therefore receive the associated Library Item with a first configuration. By comparison, a user who is participating in an "early access" program for the application may receive an aggressively updated version of the Library Item having a second configuration.

Through the use of conflict keys and nested logic within an Assignment Map, a configuration may be evaluated for a user device that would be cumbersome to achieve using a conventional organizational unit configuration methodology. For example, in an organization unit structure, it is relatively easy to have an evaluation flow from All Devices>Sales. However, if an administrator wanted to add in the early access program condition, administrators would have to add that configuration at a sub-layer, such as All Devices>Sales>Early Access.

Conventional organization unit structures may become complicated if the administrator also wants the early access program to apply to users in a group other than Sales. Because the Assignment Map reconvenes to a root line from nested logic groups, the early access program may be applied to anyone, regardless of conditions earlier along the root line of the Assignment Map. By comparison, in an organizational unit structure, the administrator would need to duplicate those deepest levels of logic each time they needed to be considered, i.e., All Devices>Sales>Early Access, All Devices>Engineering>Early Access, All Devices>Marketing>Early Access, and so on.

Returning attention to FIG. 8, at step 804, the Assignment Maps module 411 uses the identified conflict K as an index (e.g., into a dictionary or database structure) in the configuration data object and determines if previously stored Library Item data L' is at that index. If it is determined at step 804 that Library Item data exists at the index K, flow continues to step 806. At step 806, the Assignment Maps module 411 flags the Library Item L at index K in the configuration data as having a conflict. The flag may be subsequently used by the Assignment Maps module 411 to create a graphical indication in the Assignment Map canvas 902 or surrounding user interface that a conflict has occurred.

Flow then continues to step 808, in which the Library Item L is stored in the configuration data object at index K, thereby overwriting the previously stored Library Item data L'. If it had instead been determined at step 804 that there was no previously stored Library Item data L' stored at index K within the configuration data object, flow of the process directly proceeds to step 808 without flagging that a conflict had occurred.

In accordance with some examples, FIG. 9A illustrates an implementation of a graphical user interface ("user interface") 900 for interacting with and configuring an Assignment Map in an Assignment Map canvas 902 (e.g., as generated by the management platform 110 through a web portal or as a downloadable application on a computing device). The user interface 900 is an implementation example of how an administrator may define, modify, and manage Assignment Maps using the management platform 110 in conjunction with its Assignment Maps module 411, as well as other modules such as the Library Items module 413, and the Managed Devices module 414.

The Assignment Map canvas 902 is a workspace represented graphically within the user interface 900, allowing the administrator to interact with its components, such as conditional logic blocks and conditional logic nodes. The user interface 900 includes a Library Item catalog interface 904, which displays a list of available Library Items that the administrator may place onto the Assignment Map canvas 902 (e.g., via drag-and-drop). These Library Items, such as applications, policies, or configuration settings, are managed by the Library Items module 413 of the management platform 110.

A Library Item search bar 906 is located within the Library Item catalog interface 904, enabling the administrator to search for specific Library Items by title, type, or other attributes. This search functionality is integrated with the Library Items module 413 to provide quick and efficient access to the catalog of Library Items available for deployment.

The Assignment Map canvas 902 includes a root line 910, which represents the primary flow of logic evaluation across the Assignment Map canvas 902. Along the root line 910, various conditional logic blocks are positioned by the administrator to define conditional logic for device configurations. Each conditional logic block includes one or more conditional logic nodes.

In the example shown, a first conditional logic node 914a is placed within the first conditional logic block 912a and includes a conditional logic statement, referred to herein as an "assignment rule" (e.g., "For All devices on this Blueprint"). (An Assignment Map is a type of "Blueprint" which is a high-level organization of policies and settings.) This assignment rule establishes the criteria for applying specific Library Items to user devices that meet the specified conditions. In some examples, the administrator can configure the conditional logic node 914a to define or modify the associated logic and assign relevant Library Items to the user devices being considered. The first conditional logic block 912a is used as a default conditional logic block to apply organizational-wide Library Items to all of the user devices associated with a given Assignment Map. In some examples, the first conditional logic block 912a cannot include additional conditional logic nodes beyond a default assignment rule pertaining to all user devices.

The user interface 900 is designed to facilitate a clear and intuitive interaction model for defining and managing Assignment Maps within the Assignment Map canvas 902. For example, administrators can use drag-and-drop functionality to add Library Items to conditional logic nodes and to adjust the structure of the Assignment Map graphically by modifying the placement of conditional logic blocks along the root line 910. As such, the Assignment Map canvas 902 provides immediate feedback and allows for efficient management of complex device configuration scenarios.

Additionally, the user interface 900 advantageously provides administrators with the ability to search for a user device assigned to a particular Assignment Map and see the logic evaluation flow that the user device would follow through an Assignment Map to receive a collection of Library Items. The user interface 900 additionally displays when particular Library Items have been excluded from being applied to the user device for other reasons (e.g., the Library Item was assigned to the user device but was not compatible with that device, the Library Item was manually excluded, etc.). In this way, the user interface 900 displays all of the Library Items assigned to a user device, as well as provides a traceable display of the logic behind each assignment.

Within the user interface 900, an administrator may advantageously: search for particular assignment rules or Library Items, sort Library Items by different parameters (name, date created, recently updated, etc.), search, filter, and sort the bank of Library Items 904 (e.g., by user device hardware, etc.), view Library Item details, add, modify, and delete Library Items, conditional logic blocks, and conditional logic nodes, expand and collapse conditional logic blocks and conditional logic nodes, zoom/pan within the Assignment Map canvas 902, search, sort, and filter based on user devices, access Application Programing Interfaces to programmatically configure Assignment Maps, and audit events within the Assignment Map canvas 902 (e.g., date that a change was made, and the user responsible for the change), among other features disclosed herein.

In accordance with some examples, FIG. 9B illustrates the first step in a sequence of views (FIG. 9B through FIG. 9E) demonstrating steps taken as an administrator fully specifies an Assignment Map within the user interface 900. As described above, the user interface 900 enables the administrator to define conditional logic blocks and their associated components to specify the configurations that will be applied to associated user devices.

In the example shown, the Assignment Map canvas 902 includes the first conditional logic block 912a which contains the first conditional logic node 914a. The conditional logic node 914a includes an assignment rule 916a and an associated set of Library Items 918a. The assignment rule 916a defines the condition(s) that must be satisfied for the Library Items 918a to be applied to associated user devices. For example, the assignment rule 916a might specify a condition such as "For all devices in the Sales department."

If the assignment rule 916a is satisfied (e.g., evaluates as TRUE) for a given user device, the Library Items 918a associated with the conditional logic node 914a will be applied to that user device. These Library Items may include specific applications, security policies, or configuration settings, as defined or selected by the administrator.

Conversely, if the assignment rule 916a evaluates as FALSE, the logic flow moves to subsequent conditional logic nodes (if present) or subsequent conditional logic blocks (if present) within the Assignment Map, depending on the structure thereof.

At 920a (labeled "1"), the user interface 900 provides a "plus" button that enables the administrator to add another conditional logic block to the Assignment Map canvas 902. By clicking the "plus" button, the administrator can define additional conditional logic blocks with their respective conditional logic nodes, assignment rules, and associated Library Items. This functionality enables the administrator to build a layered, structured Assignment Map to efficiently manage configurations across a diverse set of user devices.

FIG. 9C illustrates an example of a next step for creating an Assignment Map, in which a new conditional logic block 912b has been added to the Assignment Map canvas 902 by the administrator. The new conditional logic block 912b was created when the administrator clicked the "plus" button at 920a in FIG. 9B.

The newly added conditional logic block 912b includes a first blank assignment rule 916b and a second blank assignment rule 916c. The blank assignment rules serve as placeholders, prompting the administrator to define the conditions and associated Library Items that should be applied when these rules are satisfied. Indeed, at 920b (labeled "2"), the administrator may click an edit icon (represented as a pencil icon) associated with the first blank assignment rule 916b to configure the user device parameters that should apply to the "If" condition. This action enables the administrator to specify the criteria for the assignment rule, such as "If the device is in the Marketing department" or "If the device is running OS version 12 or higher." The assignment rule ensures that specific conditions are defined for the first branch of the conditional logic block 912b.

Additionally, at 920c (labeled "3"), the administrator has the option to click the "plus" button within the same conditional logic block to add any number of "else if" conditions, each conditional logic block terminating with a single "else" condition. By doing so, the administrator can create additional branches within the conditional logic block 912b and configure assignment rules for those conditions. This functionality allows for the creation of granular logic, ensuring that user devices meeting different criteria can be assigned distinct configurations.

FIG. 9D illustrates the administrator's progress in specifying an Assignment Map using the user interface 900, in accordance with some examples. In the step shown, the administrator has specified the details of the assignment rule 916b within the conditional logic block 912b, along with associated Library Items 918b that will be applied if the assignment rule 916b is satisfied (e.g., based on metadata associated with the user device being evaluated). For example, the assignment rule 916b might state: "If Enrollment Type is Automated Device Enrollment and OS is greater than 11.0." If this assignment rule 916b evaluates as TRUE for a given user device, the first Library Items 918b will be applied to that device.

Conversely, the administrator has also specified second Library Items 918c that will be applied to the user device configuration data if the assignment rule 916b evaluates as FALSE. In this case, the evaluation would flow to the "else" branch of the conditional logic block 912b and the second Library Items 918c will be applied to the configuration data of the User Device. These configurations provide a fallback set of policies or applications for user devices that do not meet the conditions specified in the assignment rule 916b.

At 920d (labeled "4"), the administrator may continue adding library items to be applied to the user device being considered if the assignment rule 916b evaluates to TRUE.

FIG. 9E illustrates a next step in specifying an Assignment Map, in which an administrator has continued to add and configure conditional logic blocks within the Assignment Map canvas 902 using the user interface 900, in accordance with some examples. This figure demonstrates the administrator's ability to build more complex logic within the Assignment Map by using the "plus" button at 920e (labeled "5") to define a set of nested conditional logic blocks having an evaluation flow that diverges from the root line 910.

As shown, the Assignment Map now includes multiple conditional logic blocks, such as the previously configured block 912b and a newly added conditional logic block 912c. The nested logic of conditional logic block 912c may include any number of conditional logic nodes as described above. In addition to the root line 910, a secondary evaluation flow 911 is created to graphically distinguish to an administrator that nested logic evaluation has branched off from the root line 910. Additional secondary logic evaluation flows may be further branched from the set of nested conditional logic blocks. As was shown and described with reference to FIGS. 5A-B, the additional evaluation flow(s) 911 ultimately reconverge with the root line 910 to provide a coherent configuration for the associated user device.

The functionality provided by nested conditional logic blocks enables the administrator to create additional layers of logic that can target different subsets of user devices based on distinct criteria. For example, the new conditional block 912c may be intended to define assignment rules for user devices that fall outside the scope of the assignment rules defined in the earlier block 912b.

Once the administrator is satisfied with the configuration of the Assignment Map within the user interface 900, they may initiate the process of evaluating the Assignment Map and applying the resultant configuration data to the associated user devices ("committing" the Assignment Map). This process may be facilitated by the management platform 110, which leverages the Assignment Maps module 411, the Library Items module 413, the Managed Devices module 414, and the Configuration Sync module 415 to ensure that the configurations defined within the Assignment Map are accurately and efficiently deployed.

In some examples, the administrator commits the Assignment Map by saving the map via the user interface 900. Upon saving, the Assignment Maps module 411 finalizes the defined assignment rules and associated Library Items. In some examples, this step includes parsing the assignment rules to ensure there are no unresolved conflicts or logical inconsistencies (e.g., as described with reference to the process 600). If conflicts or errors are detected, the module displays them to the administrator for resolution before proceeding.

In some examples, all conflicts are resolved iteratively while an administrator is in the process of creating an Assignment Map. For example, if a user is trying to create a Library Item assignment that conflicts, and the Assignment Maps module 411 is not able to resolve the conflict, the Assignment Maps module 411 may prevent the user from making the attempted Library Item assignment.

Once the Assignment Map is finalized, the management platform 110 evaluates the Assignment map to generate configuration data for the associated user devices in the network segment. This process begins with the Assignment Maps module 411 evaluating the assignment rules for each conditional logic block in the map in accordance with a relative graphical position of the conditional logic blocks within the Assignment Map. For each user device registered in the Managed Devices module 414, the module evaluates the device's attributes against the conditions defined in the assignment rules. Based on this evaluation, if user device attributes satisfy an assignment rule within a conditional logic block, any Library Items associated with that rule are included in the configuration data for the device, and the conditional logic block is exited as the evaluation flow continues. If an assignment rule is not satisfied, evaluation of the assignment map may proceed to a next conditional logic node in the same conditional logic block (e.g., an "else" branch), applying the associated Library Items in accordance with the evaluation of the associated assignment rules.

In some examples, as part of this process, the Assignment Maps module 411 resolves any priority conflicts between overlapping rules or Library Items to ensure that the generated configuration data is consistent and conflict-free.

Once the configuration data is generated, it is passed to the Configuration Sync module 415, which coordinates the deployment of the configuration data to the user devices. The Configuration Sync module transmits the data over a network connection, such as the network 222 shown in FIG. 2, ensuring that each user device receives the appropriate configuration data. The module may also verify the successful transmission and application of the configurations on the user devices.

Upon receiving the configuration data, the device agent 350 (and/or a built-in agent of an operating system at the user device) on each user device applies the received Library Items. This may involve installing applications, updating security policies, or modifying device settings as defined in the Assignment Map. The device agent reports the status of the applied configurations back to the management platform 110, enabling the administrator to monitor compliance and troubleshoot any issues that arise.

FIG. 9F illustrates an example of an administrator using the Assignment Map canvas 902 within the user interface 900 to trace the evaluated logic of the Assignment Map for a specific user device or group of user devices. This feature provides a graphical representation of the assignment rules that were satisfied (and Library Items that were applied to the selected devices) using a first visual motif (e.g., highlighting, surrounding with a line or color, displaying in a resolution, brightness, or contrast that is either a default level or a greater level than a non-highlighted portion, etc.), while displaying assignment rules that were not satisfied (and associated Library Items that were not applied) using a second visual motif (e.g., greying them out, using a lower resolution, brightness or color, etc.).

The Assignment Map canvas 902 shown includes multiple conditional logic blocks, such as the first conditional logic block 912a and the second conditional logic block 912b. In this figure, the user interface 900 dynamically highlights the path of logic by maintaining a normal display for the assignment rules and Library Items that were applied and greying out those that were bypassed.

In the first conditional logic block 912a, an assignment rule is evaluated as TRUE for the selected user device(s), resulting in the application of the Library Items displayed within that conditional logic block. As such, these Library Items remain visually prominent in accordance with a first visual motif to indicate that they were applied to the device(s).

In the second conditional logic block 912*b*, the visualization illustrates that the evaluation progressed through multiple branches. A first assignment rule 916*c* is greyed out in accordance with a second visual motif, indicating that its condition was evaluated as FALSE. As a result, the Library Items 918*d* associated with this assignment rule were not applied. The evaluation then moved to the "else if" branch, where an assignment rule "User department is R&D" 916*d* was evaluated as TRUE. This is visually represented by the active display of the rule and the associated Library Items 918*e*. These Library Items were applied to the user device(s) based on the satisfied assignment rule.

The greying out of unsatisfied assignment rules and their Library Items provides the administrator with a clear understanding of why certain configurations were or were not applied to the selected user device(s). This feature advantageously enables the administrator to verify that the Assignment Map behaves as intended and to troubleshoot any discrepancies in device configurations.

By enabling a clear visual distinction between satisfied and unsatisfied assignment rules, the management platform 110 and the Assignment Maps module 411 enable administrators to manage complex device configurations and are particularly useful in large-scale deployments, where understanding the logic behind applied configurations is critical to maintaining compliance and ensuring operational consistency.

In accordance with some examples, FIG. 9G illustrates a contemplated visualization tool within the user interface 900, which allows an administrator to add annotations to conditional logic nodes, conditional logic blocks, or groups thereof. In the example shown, the Assignment Maps module 411 provides a graphical user interface at 920*f* which enables an administrator to add an annotation 926 to the conditional logic block 912*a* and then click the "plus" button to enter the administrator's desired text.

Annotations enable administrators to create visual borders around elements of an Assignment Map, such as conditional logic blocks, conditional logic nodes, assignment rules, and Library Items, to which they can then add labels, descriptions, and colors, in order to provide documentation for themselves and others. In some examples, such annotations include visual borders (e.g., shapes, animations, lines, shading, color, etc.) that encompass (e.g., as a full or partial fill and/or an outer perimeter) annotated elements within the Assignment Map canvas. An annotation may include text, graphics, animations, video, audio, or a combination thereof.

In some examples, an "annotation menu button" is provided by the user interface 900 (not shown). Upon clicking the button, an administrator is provided with an option to create an annotation within the Assignment Map canvas 902. Once selected, the user interface 900 provides an "annotation mode" in which the administrator can select conditional logic blocks (or other elements) to group inside an annotation. In some examples, the administrator can either drag along the Assignment Map canvas 902 or click single or groups of multiple conditional logic blocks.

In some examples, conditional logic blocks are selected within a horizontal selection tool, meaning that all conditional logic blocks that fall within a certain horizontal area will be selected. In some examples, if the administrator clicks to select two non-adjacent conditional logic blocks, the conditional logic blocks between them will automatically be selected.

In some examples, on a mouse-up event (of a drag, single select, or multi-select), the annotation is created. A "mouse-up" event occurs when a user releases a mouse or track-pad button after having depressed that button. In some examples, the annotation includes a box around the selected conditional logic blocks, an editable title, and optional description, and a "more" button (e.g., the "plus" button).

The more button may include options to change the colors of the annotation or delete it. The administrator may additionally select an annotation border to redraw the selected area for the annotation by dragging the selected border. When zooming or changing the size of conditional logic blocks within the Assignment Map canvas 902, the annotations advantageously grow or shrink to continue tightly bordering the selected elements. When adding conditional logic blocks in between existing conditional logic blocks in an annotation (e.g., between a first and last block of the annotation), the annotation grows to include the added conditional logic blocks.

Additionally, annotations may overlap while preserving their borders by graphically offsetting the borders of annotations that appear further to the right on the map outside of those that appear further to the left.

By enabling administrators to attach descriptive text to specific elements of the Assignment Map within the Assignment Map canvas 902, the Assignment Maps module 411 facilitates improved clarity, collaboration, and scalability across a range of device configuration scenarios. For example, administrators can use annotations to document the purpose and intent behind specific conditional logic blocks or nodes, allowing other administrators to quickly understand the reasoning behind particular assignment rules. An annotation could specify that a conditional logic block applies onboarding configurations for new hires, or that a particular node enables advanced security policies for high-risk departments. This contextual information ensures that the Assignment Map remains comprehensible and actionable, even as the complexity of the logic grows.

Annotations also improve collaboration in multi-administrator environments by serving as a communication tool. Administrators can leave notes for colleagues to explain recent changes, provide instructions for updates, or document the rationale for specific configurations. This reduces the risk of misinterpretation or errors when multiple team members are managing the same Assignment Map and eliminates the need for external documentation systems. For example, an annotation might clarify that a conditional logic node was added in response to a specific compliance requirement or organizational policy change.

Additionally, by simplifying troubleshooting and auditing processes, annotations make the Assignment Map more accessible to both administrators and compliance teams. When issues arise, annotations can provide immediate insight into the purpose of problematic rules, enabling faster resolution. For example, an annotation might indicate that a particular Library Item of a conditional logic node disables USB access on user devices used in secure facilities, helping administrators quickly verify its intended function. Similarly, auditors can review annotations to understand how the Assignment Map aligns with organizational or regulatory requirements without requiring additional explanations from administrators.

Still additionally, the ability to annotate Assignment Maps also supports scalability by enabling administrators to efficiently manage increasingly complex Assignment Maps. As the number of conditional logic blocks and conditional logic nodes grows, annotations provide a way to summarize and describe the logic within each element, maintaining an organized and comprehensible structure. This is particularly important for large organizations with diverse device configurations and policies.

In some examples, the Assignment Maps module 411 provides a multi-editor mode that enables multiple administrators to edit an Assignment Map simultaneously while displaying any changes live so that all users can view the most up-to-date version of the Assignment Map. In such examples, the Assignment Maps module 411 may additionally include collaboration tools such as commenting, highlighting a selected area being edited, showing the cursor of each administrator, and a generating detailed change log of who made which changes.

In accordance with some examples, FIGS. 9H-9K illustrate a contemplated visualization tool within the user interface 900 for displaying differences between Assignment Map versions.

"Diff" views enable administrators to visually compare changes between two versions of an Assignment Map by displaying which elements were added, modified, and removed. In some examples, a change list entry for an Assignment Map is created by the Assignment Maps module 411 whenever changes are saved. In some examples, the change list may be displayed in the user interface 900 with an option to "View changes".

Upon selecting this option, the Assignment Maps module 411 generates and displays a "diff view" that compares two versions of the Assignment Map (e.g., the change list entry selected vs. the current version). In some examples, elements of the Assignment Map, such as Library Items, assignment rules, conditional logic nodes, and/or conditional logic blocks that have been added may be indicated in green, and elements that have been removed may be indicated in red. Assignment rules that have been modified may be indicated using the same motif or may be indicated using a different motif (e.g., using text mark-up conventions such as underlined additions and strike-through deletions).

In some examples, hovering over the added/removed selection indicators gives details of the particular Assignment Map version in which that element was modified, time/date, and by whom. In some examples, the versions being compared can be selected via a dropdown menu within a user interface 900'.

In a simplified example shown of a graphical user interface 900' in FIG. 9H, a text bubble 930 provides a graphical indication of the Assignment Map version number, date, and author associated with a Library Item 928a that was added in the indicated version, and a second graphical indication 928b for a Library Item that was removed in the indicated version. As shown at 928c, in some examples, graphical indications are not displayed for unmodified elements. The example interface shown provides administrators with a visual reference to quickly determine what has changed within an Assignment Map over time. This feature may be used by the administrator as part of a troubleshooting process, and/or as part of a collaborative effort with other administrators within an organization. For example, using the "diff view", an administrator may quickly identify and correct any unintended, undesired, and/or incorrect configuration updates that have been made by modifying one or more conditional logic blocks (i.e., a conditional logic block and/or the contents thereof) of an Assignment Map based on the rendered diff view.

As shown in FIG. 9I, a graphical indication indicating differences between Assignment Map versions may be applied to assignment rules. For example, graphical indications 916e and 916e' illustrate that a first assignment rule "User group is Developers" 916e within a conditional logic block 912d has been replaced by a second assignment rule "User group is Full-time employees" 916e'. Additionally, a graphical indication 928e indicates that two Library Items have been removed (i.e., "2–") from a conditional logic node 914b and that two Library Items have been added (i.e., "2+") to that conditional logic node.

Similarly, as shown in FIG. 9J, a graphical indication indicating differences between Assignment Map versions may be applied to conditional logic blocks. For example, graphical indications illustrate that a first conditional logic block 912e has been replaced by a second conditional logic block 912e'. Of course, such graphical indications may be combined to illustrate that multiple aspects within an Assignment Map have changed between Assignment Map versions. For example, as shown in FIG. 9K, a conditional logic block 912f has been added and a conditional logic block 912f has been removed from the Assignment Map. Additionally, an annotation within Library Items 918g and 918g' indicates that a Library Item has been deleted from the associated conditional logic nodes.

As shown in FIG. 9L, in addition to representing an Assignment Map in the Assignment Map canvas, in some examples the user interface 900 is configured to display a text description 934 for a particular Library Item detailing the assignment rules that must be satisfied for that Library Item to be applied to associated user devices.

This plain text display may additionally indicate which assignment rules have been satisfied for the Library Item in the Assignment Map using a first visual motif (e.g., a checkmark), and which assignment rules have not been satisfied for the Library Item in the Assignment Map using a second visual motif (e.g., an "x" mark).

Additionally, in the example shown, the text display 934 indicates how many times a "File Vault" Library Item appears in an associated Assignment Map (i.e., "Used in this flow 2 times"), how many user devices the Library Item has been installed on (i.e., "15 successes"), how many user devices the Library Item has a pending installation of the Library Item (i.e., "15 pending"), how many user devices experienced an error in installing the Library Item (i.e., "15 error"), as well as other details.

In some examples, the Assignment Maps module 411 allows administrators to specify particular user devices to be excluded in an Assignment Map from receiving a particular Library Item. This feature may be advantageously used by an administrator when troubleshooting issues with a Library Item on a single device. In a portion of an example implementation shown in FIG. 9M, text overlays 932a and 932b indicate to an administrator that a particular Library Item ("App Store Profile") within a conditional logic block 912g has been manually excluded for one user device in the Assignment Map.

Additionally, in some examples, the user interface 900 is configured to enable administrators to preview the configuration changes that a given Assignment Map will make to associated user devices before applying those changes. Previewing changes to a user device works similarly to displaying the Assignment Map "diff" evaluations for a particular user device, except that the configuration preview displays the future state of a user device if the administrator were to commit their changes. In some examples, a preview interface provides a slider to change the view between a future state and the current state so that the administrator can easily compare the changes. For example, using the preview interface, an administrator may quickly identify and correct any unintended, undesired, and/or incorrect configuration updates that have been made by modifying one or more conditional logic blocks (i.e., a conditional logic block and/or the contents thereof) of an Assignment Map based on the rendered preview.

For example, in accordance with some examples, FIG. 9N illustrates a configuration preview interface 940a that displays an Assignment Map canvas 902' having an evaluated logic flow that has not yet been applied to the associated user devices. FIG. 9O further illustrates a split view ("slider") between the configuration preview interface 940a that shows the previewed Assignment Map canvas 902' and a current view interface 940b that shows a currently assigned Assignment Map canvas 902" for any associated user devices. By comparing the Assignment Maps 902' and 902" using the interfaces 940a-940b, an administrator may quickly identify and correct any unintended configuration updates that will be made by committing the previewed Assignment Map 902'.

Previewing changes to a user device works similarly to user device lookup, except that it shows the future state of a device if the user were to commit their changes. Similar to performing a user device lookup when viewing a committed configuration state, a user device can also be searched while the administrator is editing an Assignment Map. Once the administrator selects the user device, the administrator may then select a user device preview mode to compare an uncommitted configuration and a currently applied configuration. The uncommitted "preview" configuration displays to the administrator how the logic will be evaluated on the selected user device with the current state of the Assignment Map being edited.

Additionally, as shown in FIG. 9P, in some examples, a simplified Assignment Maps canvas 902 may be presented to an administrator to reduce the complexity of the Assignment Map view. In such examples, only an "All Devices" conditional logic block 950 is initially displayed so that the administrator is not overwhelmed. The administrator may then add conditional logic blocks to the Assignment Map canvas by selecting an "add logic" user interface element 952. Library Items may still be dragged in/removed within the Assignment Map canvas 902, but no assignment rules are initially applied. An administrator may then select the Library Item to "Add conditional logic". On selection, the Assignment Map canvas 902 will transition to the full Assignment Map interface described above with the existing "All Devices" node 950 at the beginning and a conditional block (not shown) added to the right. After this step, the Assignment Map canvas 902 behaves as described above. However, if all conditional logic blocks are deleted, the user interface returns to the simplified view shown in FIG. 9P.

In some examples, conditional logic nodes within conditional logic blocks may be "stacked" so that an Assignment Map does not become too wide horizontally when Administrators need to add several nested logic blocks. For example, a linear series of conditional logic blocks with only one "if" statement may be stacked vertically to avoid long horizontal maps. Stacking conditional logic nodes does not change the logic, but advantageously provides an easy way for Administrators to view complicated conditional logic blocks.

Figure 10:
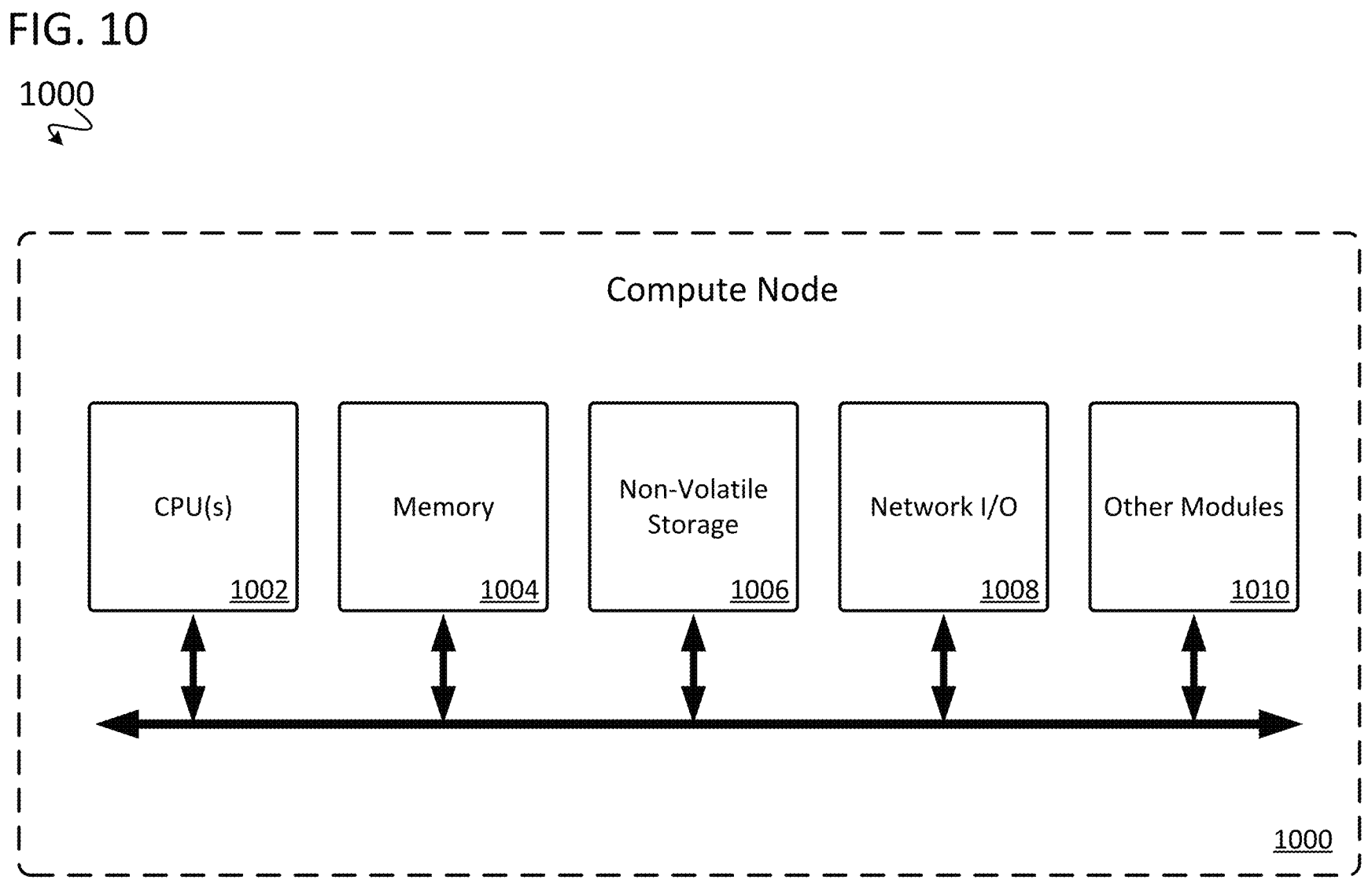

FIG. 10 illustrates an example compute node 1000 having one or more processors that could be used as a hardware platform for implementing all or a portion of each of the management platform 110, the administrator device 224, and/or the user devices 226a-n, in accordance with some aspects. The compute node 1000 generally includes one or more CPUs 1002 (e.g., processors), a memory module 1004 (e.g., RAM), a non-volatile data storage module 1006 (e.g., a hard-drive/disk-drive or array of hard-drives/disk-drives), a network I/O module 1008 (e.g., a network interface card (NIC) and/or a top-of-rack interface), and other modules 1010 such as user I/O, wireless communication modules, optical communication modules, system diagnostic or monitoring modules, or other modules. The CPUs 1002 are operable to perform processes in association with the memory module 1004 and the non-volatile data storage module 1006. In some embodiments, one or more compute nodes 1000 are configured to perform all or a portion of the process 600 disclosed herein. In such embodiments, the memory module 1004 and the non-volatile data storage module 1006 may include all, or a portion of the programs and data required by the CPUs 1002 to perform the process 600 disclosed herein.

Reference has been made in detail to examples of the disclosed invention, one or more examples of which have been illustrated in the accompanying figures. Each example has been provided by way of an explanation of the present technology, not as a limitation of the present technology. In fact, while the specification has been described in detail with respect to specific examples of the invention, it will be appreciated that those skilled in the art, upon attaining an understanding of the foregoing, may readily conceive of alterations to, variations of, and equivalents to these examples. For instance, features illustrated or described as part of one example may be used with another example to yield a still further example. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method, comprising:

graphically rendering, by one or more processors, a graphical user interface having an Assignment Map canvas for specifying an Assignment Map, the Assignment Map graphically representing configuration data for a set of one or more user devices;

receiving, by the one or more processors, user input specifying a plurality of sets of conditional logic nodes graphically arranged within the Assignment Map canvas within a plurality of conditional logic blocks that are arranged at respective graphical positions along a root line within the Assignment Map canvas;

wherein the plurality of conditional logic blocks are graphically arranged at respective graphical positions along the root line based on an order in which the plurality of conditional logic blocks are to be evaluated;

wherein each conditional logic block comprises a set of one or more conditional logic nodes;

wherein the sets of conditional logic nodes are graphically arranged within the conditional logic blocks based on an order in which the conditional logic nodes are to be evaluated;

wherein each conditional logic node includes a respective assignment rule and one or more of the conditional logic nodes is associated with a respective set of one or more Library Items;

for each user device of the set of one or more user devices, evaluating, by the one or more processors, the plurality of conditional logic blocks in an order determined by relative graphical position of each conditional logic block along a root line within the Assignment Map canvas;

generating, by the one or more processors, respective configuration data for each user device based on an evaluation outcome of the plurality of conditional logic blocks, the respective configuration data including one or more Library Items selected for that user device;

determining, by the one or more processors, a priority hierarchy of the plurality of conditional logic blocks based on the relative graphical positions of the conditional logic blocks within the Assignment Map canvas;

resolving, by the one or more processors, conflicts between Library Items within the Assignment Map based on the determined priority hierarchy of the conditional logic blocks;

transmitting, by the one or more processors, the respective configuration data to each user device via a secure communication channel encrypted using an encryption protocol; and applying, by a device agent on each user device, the one or more Library Items specified in the respective configuration data;

wherein the evaluating the plurality of conditional logic blocks comprises:

for each user device of the set of one or more user devices, iterating through each conditional logic block in the Assignment Map canvas in an order based on relative graphical positions therebetween;

for each conditional logic block, iterating through one or more conditional logic nodes in the conditional logic block;

determining, for each conditional logic node, whether attributes of the user device satisfy an assignment rule of that conditional logic node;

in response to determining that the assignment rule is satisfied, adding a respective set of one or more Library Items associated with that conditional logic node to the configuration data for that user device; and ceasing evaluation of subsequent conditional logic nodes within that conditional logic block and proceeding to evaluate a next conditional logic block of the plurality of conditional logic blocks.

2. The method of claim 1, wherein evaluating the plurality of conditional logic blocks comprises:

identifying, by the one or more processors, the root line of the Assignment Map canvas, the root line defining a primary evaluation flow of the plurality of conditional logic blocks;

identifying, by the one or more processors, one or more nested conditional logic blocks having a secondary evaluation flow that diverges from the primary evaluation flow of the root line;

evaluating, by the one or more processors, the nested conditional logic blocks along the secondary evaluation flow; and reconverging, by the one or more processors, the secondary evaluation flow with the primary evaluation flow of the root line after evaluation of the nested conditional logic blocks.

3. The method of claim 2, wherein:

the primary evaluation flow of the root line and the secondary evaluation flow of the nested conditional logic blocks are graphically distinguished within the Assignment Map canvas, and wherein the graphical distinctions include:

rendering, by the one or more processors, the root line as a continuous graphical path connecting a first set of conditional logic blocks of the plurality of conditional logic blocks;

graphically rendering, by the one or more processors, the nested conditional logic blocks as a second set of conditional logic blocks having a parallel graphical path diverging from the root line; and visually indicating, by the one or more processors, a reconvergence point where the parallel graphical path of the nested conditional logic blocks reconnects with the root line.

4. The method of claim 2, further comprising:

determining, by the one or more processors, an evaluation priority for the nested conditional logic blocks based on their graphical positions within the Assignment Map canvas; and resolving, by the one or more processors, conflicts between Library Items associated with the root line and Library Items associated with the nested conditional logic blocks based on the evaluation priority to generate the configuration data for each user device.

5. The method of claim 1, wherein:

the attributes of the user device comprise one or more of a user device type, an operating system version of the user device, a user profile of a user associated with the user device, and a group membership of a user associated with the user device.

6. The method of claim 1, wherein generating respective configuration data for each user device comprises:

identifying a conflict key associated with each Library Item of the respective set of Library Items;

determining whether Library Item data already exists at an index in the configuration data corresponding to the conflict key; and in response to determining that Library Item data already exists at the index, flagging the respective Library Item as having a conflict.

7. The method of claim 6, further comprising:

storing the respective Library Item at the index in the configuration data, wherein the stored Library Item overwrites any previously existing Library Item data.

8. The method of claim 6, wherein:

the conflict key identifies one or both of i) mutually exclusive Library Items, and ii) variants of the same Library Item.

9. The method of claim 1, wherein:

the Assignment Map canvas further enables user input for adding text annotations to one or more of the conditional logic blocks, conditional logic nodes, and Library Items, the text annotations being visually rendered within the Assignment Map canvas.

10. The method of claim 1, further comprising:

identifying, by the one or more processors, differences between a first Assignment Map and a second Assignment Map; and rendering, by the one or more processors, a graphical display depicting the differences between the first Assignment Map and the second Assignment Map.

11. The method of claim 10, further comprising:

identifying, by the one or more processors, a current configuration of a user device;

using, by the one or more processors, a committed configuration of the user device to generate the first Assignment Map; and using, by the one or more processors, an uncommitted Assignment Map as the second Assignment Map.

12. The method of claim 1, further comprising:

graphically distinguishing, by the one or more processors, each conditional logic block and conditional logic node that was satisfied for a user device during the evaluation of the plurality of conditional logic blocks, in accordance with a first visual motif; and graphically distinguishing, by the one or more processors, each conditional logic node that was not satisfied for the user device during the evaluation of the plurality of conditional logic blocks, in accordance with a second visual motif.

13. The method of claim 1, further comprising:

receiving user input specifying a particular user device; and graphically displaying a logic evaluation flow of that user device through the Assignment Map within the Assignment Map canvas, the display including:

each conditional logic block and conditional logic node evaluated for that user device;

the respective Library Items assigned to or excluded from the user device; and a graphical indication of the reasons that specific Library Items were excluded from being applied to that user device.

14. The method of claim 1, wherein:

the Assignment Map canvas provides a user interface for repositioning conditional logic blocks along the root line via drag-and-drop functionality.

15. The method of claim 1, wherein:

the graphical user interface provides a user interface for filtering Library Items by user device attributes.

16. The method of claim 1, further comprising:

generating, by the one or more processors, a graphical indication in the Assignment Map canvas for each Library Item that was excluded from being applied to a user device, wherein the graphical indication specifies the condition that caused the exclusion.

17. The method of claim 1, wherein:

the determined priority hierarchy of the plurality of conditional logic blocks is opposite to the evaluation order of the plurality of conditional logic blocks based on the relative graphical positions of the conditional logic blocks along the root line within the Assignment Map canvas.

* * * * *